(12) United States Patent
McFate et al.

(10) Patent No.: US 9,148,293 B2
(45) Date of Patent: *Sep. 29, 2015

(54) AUTOMATED NETWORK INFRASTRUCTURE TEST AND DIAGNOSTIC SYSTEM AND METHOD THEREFOR

(75) Inventors: Marlin Popeye McFate, Guntown, MS (US); Mark Vange, Scottsdale, AZ (US)

(73) Assignee: Circadence Corporation, Boulder, CO (US)

(*) Notice: Subject to any disclaimer, the term of this patent is extended or adjusted under 35 U.S.C. 154(b) by 826 days.

This patent is subject to a terminal disclaimer.

(21) Appl. No.: 13/300,934

(22) Filed: Nov. 21, 2011

(65) Prior Publication Data

US 2012/0066357 A1 Mar. 15, 2012

Related U.S. Application Data

(60) Continuation of application No. 12/317,721, filed on Dec. 23, 2008, now Pat. No. 8,065,399, which is a continuation-in-part of application No. 11/346,767, filed on Feb. 3, 2006, now Pat. No. 7,975,066, which is a division of application No. 09/835,876, filed on Apr. 16, 2001, now Pat. No. 7,127,518.

(60) Provisional application No. 60/197,490, filed on Apr. 17, 2000.

(51) Int. Cl.
*G06F 15/16* (2006.01)
*H04L 12/26* (2006.01)
(Continued)

(52) U.S. Cl.
CPC ............ *H04L 12/2697* (2013.01); *G06F 9/505* (2013.01); *G06F 9/5027* (2013.01); *G06F 9/5055* (2013.01); *G06F 9/5088* (2013.01); *H04L 29/06* (2013.01); *H04L 29/12066* (2013.01); *H04L 43/50* (2013.01); *H04L 47/10* (2013.01); *H04L 47/14* (2013.01); *H04L 47/193* (2013.01); *H04L 47/24* (2013.01);
(Continued)

(58) Field of Classification Search
USPC .................................................. 709/223, 224
See application file for complete search history.

(56) References Cited

U.S. PATENT DOCUMENTS 5,130,982 A 7/1992 Ash et al.
5,258,983 A 11/1993 Lane et al.
(Continued)

FOREIGN PATENT DOCUMENTS

EP 0384339 8/1990
EP 0774878 8/1997
(Continued)

OTHER PUBLICATIONS

K. Sriram, "Methodologies for bandwidth allocation, transmission scheduling, and congestion avoidance in broadband ATM networks", Computer Networks and ISDN Systems, 26 (1993) pp. 43-59.
(Continued)

*Primary Examiner* — David Lazaro
(74) *Attorney, Agent, or Firm* — Weide & Miller, Ltd.

(57) ABSTRACT

A testing system provides automated testing of one or more network infrastructures. The testing system may automatically reconfigure one or more devices within a network infrastructure and then conduct testing on the newly configured network infrastructure. Test results may be used to diagnose network anomalies and to compare performance or other characteristics of various network configurations. In one embodiment, the testing system tests a communication channel between a front-end and back-end mechanism where data traffic is encoded between the front-end and back-end mechanism.

20 Claims, 10 Drawing Sheets

(51) Int. Cl.

| | | |
|---|---|---|
| *G06F 9/50* | (2006.01) | |
| *H04L 29/06* | (2006.01) | |
| *H04L 29/12* | (2006.01) | |
| *H04L 12/801* | (2013.01) | |
| *H04L 12/851* | (2013.01) | |
| *H04L 29/08* | (2006.01) | |
| *H04L 12/24* | (2006.01) | |

(52) U.S. Cl.
CPC ........ *H04L61/1511* (2013.01); *H04L 63/0428* (2013.01); *H04L 63/1408* (2013.01); *H04L 63/1416* (2013.01); *H04L 63/1458* (2013.01); *H04L 67/02* (2013.01); *H04L 67/101* (2013.01); *H04L 67/1002* (2013.01); *H04L 67/1008* (2013.01); *H04L 67/1021* (2013.01); *H04L 67/1029* (2013.01); *H04L 67/1031* (2013.01); *H04L 67/1034* (2013.01); *H04L 67/142* (2013.01); *H04L 67/2804* (2013.01); *H04L 67/2814* (2013.01); *H04L 67/2819* (2013.01); *H04L 67/2823* (2013.01); *H04L 67/2842* (2013.01); *H04L 67/2847* (2013.01); *H04L 67/2852* (2013.01); *H04L 67/303* (2013.01); *G06F 2209/5021* (2013.01); *H04L 41/0813* (2013.01); *H04L 63/0272* (2013.01); *H04L 67/322* (2013.01); *H04L 69/329* (2013.01); *H04L 2029/06054* (2013.01)

(56) References Cited

U.S. PATENT DOCUMENTS

| | | | |
|---|---|---|---|
| 5,548,646 | A | 8/1996 | Aziz et al. |
| 5,673,322 | A | 9/1997 | Pepe et al. |
| 5,742,772 | A | 4/1998 | Sreenan |
| 5,757,771 | A | 5/1998 | Li et al. |
| 5,805,203 | A | 9/1998 | Horton |
| 5,850,526 | A | 12/1998 | Chou |
| 5,933,412 | A | 8/1999 | Choudhury et al. |
| 5,951,694 | A | 9/1999 | Choquier et al. |
| 5,956,330 | A | 9/1999 | Kerns |
| 5,999,971 | A | 12/1999 | Buckland |
| 6,006,264 | A | 12/1999 | Colby et al. |
| 6,023,456 | A | 2/2000 | Chapman et al. |
| 6,034,964 | A | 3/2000 | Fukushima et al. |
| 6,070,192 | A | 5/2000 | Holt et al. |
| 6,078,582 | A | 6/2000 | Curry et al. |
| 6,081,900 | A | 6/2000 | Subramaniam et al. |
| 6,138,157 | A | 10/2000 | Welter et al. |
| 6,167,449 | A | 12/2000 | Arnold et al. |
| 6,198,735 | B1 | 3/2001 | Pazhyannur et al. |
| 6,226,680 | B1 | 5/2001 | Boucher et al. |
| 6,247,060 | B1 | 6/2001 | Boucher et al. |
| 6,272,492 | B1 | 8/2001 | Kay |
| 6,310,894 | B1 | 10/2001 | Counterman |
| 6,334,153 | B2 | 12/2001 | Boucher et al. |
| 6,336,137 | B1 | 1/2002 | Lee et al. |
| 6,366,947 | B1 | 4/2002 | Kavner |
| 6,381,228 | B1 | 4/2002 | Prieto et al. |
| 6,389,479 | B1 | 5/2002 | Boucher et al. |
| 6,393,487 | B2 | 5/2002 | Boucher et al. |
| 6,427,171 | B1 | 7/2002 | Craft et al. |
| 6,427,173 | B1 | 7/2002 | Boucher et al. |
| 6,434,620 | B1 | 8/2002 | Boucher et al. |
| 6,470,415 | B1 | 10/2002 | Starr et al. |
| 6,591,288 | B1 | 7/2003 | Edwards et al. |
| 6,591,302 | B2 | 7/2003 | Boucher et al. |
| 6,594,268 | B1 | 7/2003 | Aukia et al. |
| 6,640,248 | B1 | 10/2003 | Jorgensen |
| 6,657,957 | B1 | 12/2003 | Cheung et al. |
| 6,658,480 | B2 | 12/2003 | Boucher et al. |
| 6,687,758 | B2 | 2/2004 | Craft et al. |
| 6,697,868 | B2 | 2/2004 | Craft et al. |
| 6,728,208 | B1 | 4/2004 | Puuskari |
| 6,751,665 | B2 | 6/2004 | Philbrick et al. |
| 6,757,746 | B2 | 6/2004 | Boucher et al. |
| 6,760,308 | B1 | 7/2004 | Ghanma et al. |
| 6,760,336 | B1 | 7/2004 | Mangin et al. |
| 6,785,226 | B1 | 8/2004 | Oltman et al. |
| 6,807,581 | B1 | 10/2004 | Starr et al. |
| 6,816,456 | B1 | 11/2004 | Tse-Au |
| 6,820,133 | B1 | 11/2004 | Grove et al. |
| 6,836,795 | B2 | 12/2004 | Soderberg et al. |
| 6,879,526 | B2 | 4/2005 | Lynch et al. |
| 6,938,092 | B2 | 8/2005 | Burns |
| 6,941,386 | B2 | 9/2005 | Craft et al. |
| 6,965,941 | B2 | 11/2005 | Boucher et al. |
| 6,996,070 | B2 | 2/2006 | Starr et al. |
| 6,999,471 | B1 | 2/2006 | Frazer et al. |
| 7,020,719 | B1 | 3/2006 | Grove et al. |
| 7,042,898 | B2 | 5/2006 | Blightman et al. |
| 7,076,568 | B2 | 7/2006 | Philbrick et al. |
| 7,082,467 | B2 | 7/2006 | Border et al. |
| 7,085,247 | B2 | 8/2006 | Schweinhart et al. |
| 7,089,326 | B2 | 8/2006 | Boucher et al. |
| 7,093,099 | B2 | 8/2006 | Bodas et al. |
| 7,116,936 | B2 | 10/2006 | Kim |
| 7,120,666 | B2 | 10/2006 | McCanne et al. |
| 7,124,205 | B2 | 10/2006 | Craft et al. |
| 7,127,518 | B2 | 10/2006 | Vange et al. |
| 7,133,361 | B2 | 11/2006 | Olariu et al. |
| 7,133,940 | B2 | 11/2006 | Blightman et al. |
| 7,164,661 | B2 | 1/2007 | Kelly |
| 7,167,926 | B1 | 1/2007 | Boucher et al. |
| 7,167,927 | B2 | 1/2007 | Philbrick et al. |
| 7,170,889 | B2 | 1/2007 | Eagling et al. |
| 7,174,393 | B2 | 2/2007 | Boucher et al. |
| 7,185,266 | B2 | 2/2007 | Blightman et al. |
| 7,191,241 | B2 | 3/2007 | Boucher et al. |
| 7,191,318 | B2 | 3/2007 | Tripathy et al. |
| 7,213,077 | B2 | 5/2007 | Border |
| 7,219,158 | B2 | 5/2007 | Border et al. |
| 7,237,036 | B2 | 6/2007 | Boucher et al. |
| 7,245,405 | B2 | 7/2007 | Friedman et al. |
| 7,245,930 | B1 | 7/2007 | Vishwanath et al. |
| 7,254,696 | B2 | 8/2007 | Mittal et al. |
| 7,284,070 | B2 | 10/2007 | Boucher et al. |
| 7,313,035 | B2 | 12/2007 | Lynch et al. |
| 7,336,967 | B2 | 2/2008 | Kelly et al. |
| 7,337,233 | B2 | 2/2008 | Dillon |
| 7,337,241 | B2 | 2/2008 | Boucher et al. |
| 7,359,985 | B2 | 4/2008 | Grove et al. |
| 7,370,116 | B2 | 5/2008 | Chan et al. |
| 7,386,310 | B2 | 6/2008 | Dai et al. |
| 7,388,869 | B2 | 6/2008 | Butehorn et al. |
| 7,389,330 | B2 | 6/2008 | Dillon et al. |
| 7,389,533 | B2 | 6/2008 | Bartlett et al. |
| 7,392,325 | B2 | 6/2008 | Grove et al. |
| 7,398,552 | B2 | 7/2008 | Pardee et al. |
| 7,418,518 | B2 | 8/2008 | Grove et al. |
| 7,475,164 | B2 | 1/2009 | Bai et al. |
| 7,567,653 | B1 | 7/2009 | Michaelis |
| 7,603,444 | B2 | 10/2009 | Bullis |
| 7,975,066 | B2 | 7/2011 | Vange et al. |
| 8,065,399 | B2 * | 11/2011 | McFate et al. ................ 709/221 |
| 2001/0021949 | A1 | 9/2001 | Blightman et al. |
| 2001/0023460 | A1 | 9/2001 | Boucher et al. |
| 2001/0027496 | A1 | 10/2001 | Boucher et al. |
| 2001/0043609 | A1 | 11/2001 | Chapman et al. |
| 2001/0047433 | A1 | 11/2001 | Boucher et al. |
| 2002/0023145 | A1 | 2/2002 | Orr et al. |
| 2002/0087732 | A1 | 7/2002 | Boucher et al. |
| 2002/0091844 | A1 | 7/2002 | Craft et al. |
| 2002/0095519 | A1 | 7/2002 | Philbrick et al. |
| 2002/0103881 | A1 | 8/2002 | Granade et al. |
| 2002/0129159 | A1 | 9/2002 | Luby et al. |
| 2002/0136240 | A1 | 9/2002 | Counterman |
| 2002/0156927 | A1 | 10/2002 | Boucher et al. |
| 2003/0079033 | A1 | 4/2003 | Craft et al. |
| 2003/0140124 | A1 | 7/2003 | Burns |
| 2003/0147403 | A1 | 8/2003 | Border et al. |
| 2003/0167346 | A1 | 9/2003 | Craft et al. |
| 2003/0172264 | A1 | 9/2003 | Dillon |

(56) References Cited

U.S. PATENT DOCUMENTS

| | | |
|---|---|---|
| 2003/0177395 A1 | 9/2003 | Pardee et al. |
| 2003/0177396 A1 | 9/2003 | Bartlett et al. |
| 2003/0200284 A1 | 10/2003 | Philbrick et al. |
| 2003/0219022 A1 | 11/2003 | Dillon et al. |
| 2004/0003126 A1 | 1/2004 | Boucher et al. |
| 2004/0010612 A1 | 1/2004 | Pandya |
| 2004/0054813 A1 | 3/2004 | Boucher et al. |
| 2004/0062246 A1 | 4/2004 | Boucher et al. |
| 2004/0064578 A1 | 4/2004 | Boucher et al. |
| 2004/0064589 A1 | 4/2004 | Boucher et al. |
| 2004/0064590 A1 | 4/2004 | Starr et al. |
| 2004/0073703 A1 | 4/2004 | Boucher et al. |
| 2004/0088262 A1 | 5/2004 | Boucher et al. |
| 2004/0117509 A1 | 6/2004 | Craft et al. |
| 2004/0158793 A1 | 8/2004 | Blightman et al. |
| 2004/0240435 A1 | 12/2004 | Boucher et al. |
| 2005/0081023 A1 | 4/2005 | Bullis et al. |
| 2005/0122986 A1 | 6/2005 | Starr et al. |
| 2005/0182841 A1 | 8/2005 | Sharp |
| 2005/0240372 A1 | 10/2005 | Monk |
| 2006/0010238 A1 | 1/2006 | Craft et al. |
| 2006/0129697 A1 | 6/2006 | Vange et al. |
| 2006/0159098 A1 | 7/2006 | Munson et al. |
| 2006/0168281 A1 | 7/2006 | Starr et al. |
| 2007/0006046 A1 | 1/2007 | Overman et al. |
| 2007/0022185 A1 | 1/2007 | Hamilton et al. |
| 2007/0083630 A1* | 4/2007 | Roth et al. .................... 709/223 |
| 2007/0110046 A1 | 5/2007 | Farrell et al. |
| 2007/0130356 A1 | 6/2007 | Boucher et al. |
| 2007/0223379 A1 | 9/2007 | Sivakumar et al. |
| 2007/0223481 A1 | 9/2007 | Sivakumar et al. |
| 2008/0022073 A1 | 1/2008 | Mittal et al. |
| 2008/0040519 A1 | 2/2008 | Starr et al. |
| 2008/0062879 A1 | 3/2008 | Sivakumar et al. |
| 2008/0126553 A1 | 5/2008 | Boucher et al. |
| 2008/0151917 A1 | 6/2008 | Bartlett et al. |
| 2008/0238730 A1 | 10/2008 | Eroz et al. |
| 2009/0006920 A1 | 1/2009 | Munson et al. |
| 2009/0063698 A1 | 3/2009 | Xu et al. |
| 2009/0276261 A1 | 11/2009 | Chen |
| 2009/0307763 A1* | 12/2009 | Rawlins et al. .................... 726/5 |
| 2010/0022878 A1 | 1/2010 | Azuma et al. |

FOREIGN PATENT DOCUMENTS

| | | |
|---|---|---|
| EP | 0794491 | 9/1997 |
| EP | 0828214 | 3/1998 |
| EP | 0942363 | 9/1999 |
| EP | 1443713 | 8/2004 |
| EP | 1443730 | 8/2004 |
| EP | 1443731 | 8/2004 |
| EP | 1443732 | 8/2004 |
| EP | 1333642 | 8/2008 |
| GB | 2309558 | 7/1997 |
| WO | WO97/29424 | 8/1997 |
| WO | WO97/30392 | 8/1997 |
| WO | WO98/26553 | 6/1998 |
| WO | WO98/28938 | 7/1998 |
| WO | WO99/09689 | 2/1999 |
| WO | WO99/18534 | 4/1999 |
| WO | WO99/57620 | 11/1999 |
| WO | WO99/57637 | 11/1999 |
| WO | WO03/104943 | 12/2003 |
| WO | WO2008/067597 | 6/2008 |

OTHER PUBLICATIONS

V.P. Kumar, et al., "Beyond Best Effort: Router Architectures for the Differentiated Services of Tomorrow's Internet", May 1998, IEEE Communications Magazine, pp. 152-164.

R.M. Adler, "Distributed Coordination Models for Client/Server Computing", Apr. 1995, IEEE Computer, pp. 14-22.

G.C. Lai, et al., Support QoS in IP over ATM:, Computer Communications, 22(1999) pp. 411-418.

* cited by examiner

AUTOMATED NETWORK INFRASTRUCTURE TEST AND DIAGNOSTIC SYSTEM AND METHOD THEREFOR

CROSS REFERENCE TO RELATED APPLICATIONS

This application is a continuation of U.S. patent application Ser. No. 12/317,721, filed, Dec. 23, 2008, now U.S. Pat. No. 8,065,399, which is a continuation-in-part of U.S. patent application Ser. No. 11/346,767, filed Feb. 3, 2006 now U.S. Pat. No. 7,975,066, which is a divisional of U.S. patent application Ser. No. 09/835,876, filed Apr. 16, 2001, now U.S. Pat. No. 7,127,518, which claims priority to U.S. Provisional Patent Application No. 60/197,490, filed Apr. 17, 2000.

FIELD OF THE INVENTION

The present invention relates, in general, to network performance and, more particularly, to software, systems and methods for implementing test and diagnostic functionality within a network infrastructure.

BACKGROUND OF THE INVENTION

Increasingly, business data processing systems, entertainment systems, and personal communications systems are implemented by computers across networks that are interconnected by internetworks (e.g., the Internet). The Internet is rapidly emerging as the preferred system for distributing and exchanging data. Data exchanges support applications including electronic commerce, broadcast and multicast messaging, videoconferencing, gaming, and the like.

The Internet is a collection of disparate computers and networks coupled together by a web of interconnections using standardized communications protocols. The Internet is characterized by its vast reach as a result of its wide and increasing availability and easy access protocols. Unfortunately, the heterogeneous nature of the Internet makes it difficult for the hardware and software that implement the Internet to add functionality.

The Open System Interconnection (OSI) network model usefully describes networked data communication, such as the Internet, as a series of logical layers or protocol layers. Each layer provides services to the layer above it, and shields the layer above it from details of lower layers. Each layer is configured to communicate with other similar level layers. In general, computers at network nodes (e.g., clients and servers) implement higher level processes including application layer, presentation layer, and session layer processes. Lower level processes, including network layer, data link layer and physical layer operate to place data in a form suitable for communication across a raw communication channel or physical link. Between the higher and lower level processes is a transport layer that typically executes on a machine at the network node, but is highly dependent on the lower level processes.

While standards exist for these layers, application designers have a high level of control and can implement semantics and functionality at the higher layers with a great deal of latitude. In contrast, lower layers are highly standardized. Implementing or modifying functionality in a lower layer protocol is very difficult as such changes can affect almost all users of the network. Devices such as routers that are typically associated with infrastructure operate exclusively at the lower protocol layers making it difficult or impossible to implement functionality such as real-time processing, data compression, encryption and error correction within a network infrastructure.

Although the term "Internet infrastructure" encompasses a variety of hardware and software mechanisms, the term primarily refers to routers, router software, and physical links between these routers that function to transport data packets from one network node to another.

Internet infrastructure components such as routers and switches are, by design, asynchronous. Also by design, it is difficult to accurately predict or control the route a particular packet will take through the Internet. This architecture is intended to make the Internet more robust in the event of failures, and to reduce the cost, complexity and management concerns associated with infrastructure components. As a result, however, a particular node or machine cannot predict the capabilities of the downstream mechanisms that it must rely on to deliver a packet to its destination. A sending node cannot expect all mechanisms in the infrastructure to support the functions and/or syntax necessary to implement such functions as real time processing, data compression, encryption, and error correction.

For example, it is difficult if not impossible to conduct synchronous or time-aware operations over the Internet. Such operations include, for example, real-time media delivery, access to financial markets, interactive events, and the like. While each IP packet includes information about the time it was sent, the time base is not synchronous between sender and receiver, making the time indication inaccurate. Packets are buffered at various locations through the Internet infrastructure, and there is no accurate way to ascertain the actual age or time of issue of the packet. Hence, critical packets may arrive too late.

Data compression is a well-known technique to improve the efficiency of data transport over a communication link. Typically, data compression is performed at nodes sending the data and decompression performed at a node receiving the data. Infrastructure components responsible for sending the information between the sending and receiving processes do not analyze whether effective compression has been performed, nor can the infrastructure implement compression on its own. Where either the sending or receiving process is incapable of effective compression, the data goes uncompressed. This creates undesirable burden that affects all users. While modems connecting a user over a phone line often apply compression to that link, there is no analogous function within the Internet infrastructure itself. A need exists for Internet infrastructure components that compress data between network nodes to improve transport within the Internet.

Similarly, encryption and other data security techniques are well known techniques to ensure only authorized users can read data. Like compression, however, encryption is typically performed by user-level and application-level processes. If either sending or receiving processes cannot perform compatible encryption, the data must be sent in the clear or by non-network processes. A need exists for Internet infrastructure components that apply encryption or other security processes transparently to users.

As another example, forward error correction (FEC) is a known technique to reduced traffic volume, reduce latency, and/or increase data transfer speed over lossy connections. FEC adds redundant information, also referred to as error correction code, to the original message, allowing the receiver to retrieve the message even if it contains erroneous bits. FEC coding can enhance decoded bit error rate values three orders of magnitude relative to systems not implementing any FEC techniques. When the error can be detected and corrected at the receiving end, there is less need to resend data. FEC is extensively used in many digital communication systems at some level and in mass storage technology to compensate for media and storage system errors.

However, FEC is not used within the Internet infrastructure. This stems in part from the additional complexity, cost and management tasks that such capability would impose on the system hardware and software. FEC requires that the sender and receiver both implement compatible FEC processes. Hence, most if not all infrastructure components would have to be replaced or modified to implement FEC in an effective manner. Efforts to implement FEC between sending and receiving nodes are outlined in IETF RFC 2733. This proposed standard applies to real time transport protocol (RTP) communications between a client and server. This FEC method affects endpoints to a data transfer, but does not affect servers and or other infrastructure components located between the endpoints. Hence, a need exists for systems and methods that implement FEC within the Internet infrastructure to offer the benefits of FEC technology seamlessly to network users.

In most cases these types of functionality are implemented in higher level processes (e.g., the OSI application layer, presentation layer, session layer and/or transport layer). However this requires that sending and receiving nodes implement a common syntax. For example, both sending and receiving nodes must implement complementary encryption/decryption processes, however once this is ensured, the communication will be encrypted through out transport. In practice there are multiple standards for real-time processing, encryption, compression, and error correction, and one or the other node may be unable to support the protocols of the other nodes. Hence, it is desirable to implement such functionality is a manner that is independent of the higher level processes so that otherwise incompatible or incapable application-level processes can benefit.

In other cases, for example real time processing and error correction, it is desirable to have the functionality implemented within the network infrastructure, not only between the nodes. For example, implementing error correction only between the sending and receiving nodes is only a partial solution, as the infrastructure components that operate at lower network layers (e.g., transport, network, data link and/or physical layer) cannot read error correction codes inserted at higher network layers. As another example, traffic prioritization within the network benefits from knowledge of when packets were actually sent so that they can be delivered in time for real-time processes.

A particular need exists in environments that involve multiple users accessing a network resource such as a web server. Web servers are typically implemented with rich functionality and are often extensible in that the functionality provided can be increased modularly to provide general-purpose and special-purpose functions. Examples include information services, broadcast, multicast and videoconference services, as well as most electronic commerce (e-commerce) applications. In these applications it is important that functionality provided by network-connected resources be provided in a dependable, timely and efficient manner.

Many e-commerce transactions are abandoned by the user because system performance degradations frustrate the purchaser before the transaction is consummated. While a transaction that is abandoned while a customer is merely browsing through a catalog may be tolerable, abandonment when the customer is just a few clicks away from a purchase is highly undesirable. However, existing Internet transport mechanisms and systems do not allow the e-commerce site owner any ability to distinguish between the "just browsing" and the "about to buy" customers as this information is represented at higher network layers that are not recognized by the infrastructure components. In fact, the vagaries of the Internet may lead to the casual browser receiving a higher quality of service while the about-to-buy customer becomes frustrated and abandons the transaction.

Additionally, there is a need to monitor network performance and determine failure conditions of a network resource and application within a fully functioning network infrastructure. Prior art systems have required troubleshooting of network performance issues and verification of network performance be performed manually by a network technician. This often requires many hours of manual labor to assess and diagnose network anomalies and network latencies often times changing a large number of network parameters during the test is required.

Further, such troubleshooting may require manual access to the network infrastructure and network appliance configuration to reconfigure each network resource for a particular test. This process may need to be repeated hundreds of times depending on the test sequence required.

Typically within the network environment there are other applications used in conjunction with the target network technology and appliances. Examples of such applications include:

Benchmarking applications used to perform the actual throughput testing of the given link.

WAN simulators used on one of the network resources to create the simulated Wide Area Network (WAN). This is how a link is created in a test network that resembles the desired network. For example, a T1 connection from location A in Mississippi to location B in New York.

Web server simulator used to produce the actual traffic over the test lane used to gage total throughput.

Any other network application required to test in the target network environment, such as Exchange, FTP, or a web application. These programs would reside on a content server. Client computer(s) may be used to access the application with and without an installed network appliance to measure performance gains.

Testing the network infrastructure, network appliances, and associated network applications result in very long and tedious testing efforts. For example, running and re-running the above applications for testing purposes result in very long and tedious testing efforts. Thus, there exists a need for a network product which integrates, within a network infrastructure, network appliances, network applications, or both to automatically test the targeted network technology and applications for anomalistic behavior, latency issues, and error conditions.

SUMMARY OF THE INVENTION

Briefly stated, the present invention incorporates a system and method for testing network performance and diagnosing anomalous behavior seamlessly within a network on behalf of first and second computers communicating with each other through the network. A front-end computer is provided within the network having an interface for communicating data traffic with the first computer incorporating a test component. A back-end computer is also implemented within the network having an interface for communicating data traffic with the second computer incorporating a test component. A communication channel couples the front-end computer and the back-end computer. Data traffic is encoded over the communication channel in a first process in the front-end computer. Data traffic is also encoded over the communication channel in a second process in the back-end computer, wherein the first process and the second process implement compatible semantics.

Further objects, features, and advantages of the present invention over the prior art will become apparent from the detailed description of the drawings which follows, when considered with the attached figures.

DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE INVENTION

Figure 1:
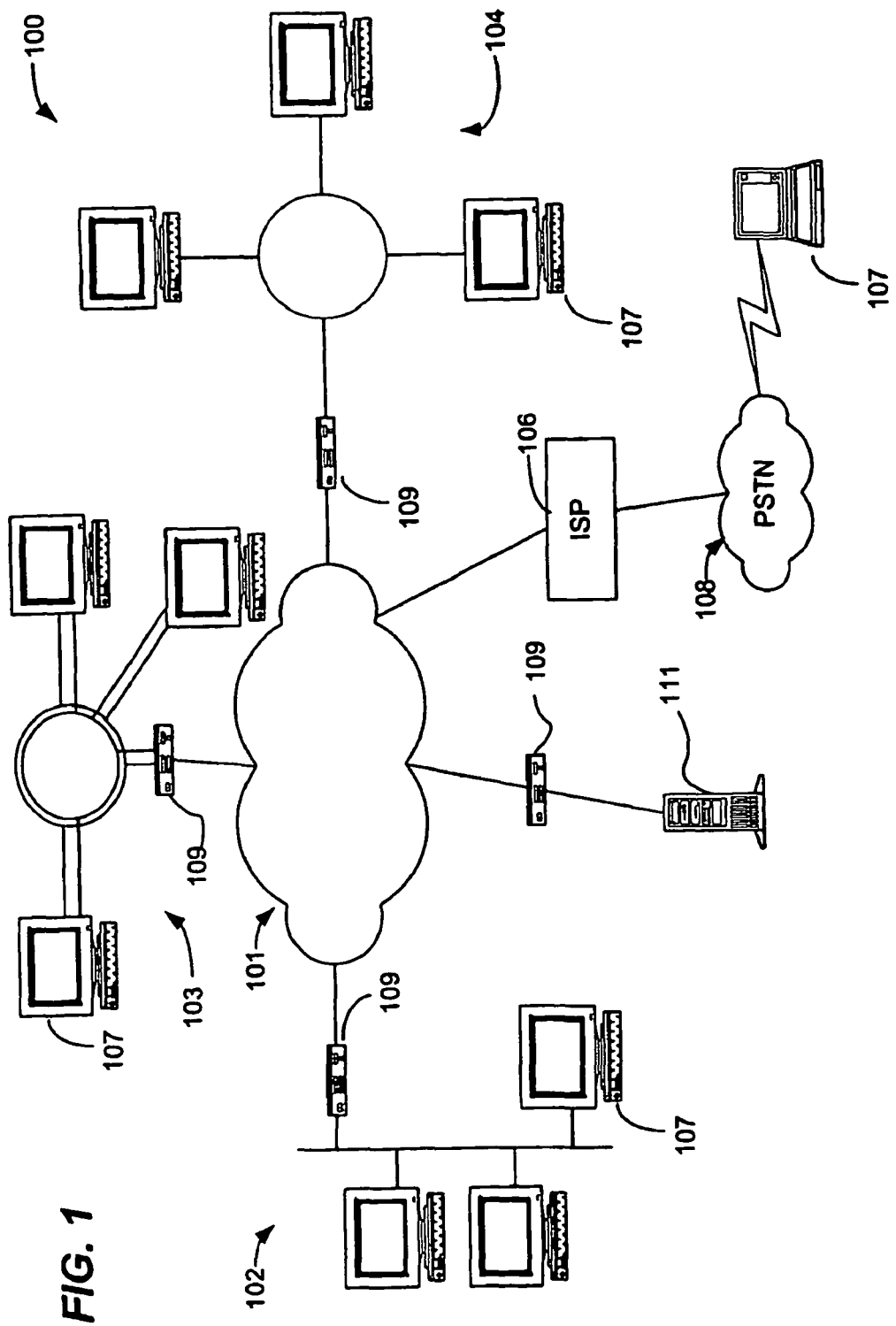
FIG. 1 illustrates a general distributed computing environment in which the present invention is implemented.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

The present inventions involve systems and methods to test network performance and diagnose anomalous behavior within a network. In general, the testing and diagnosis is automated and may perform a variety of network tests and diagnostics with little need for manual intervention. The testing and diagnosis may be performed repeatedly, at certain times, or as desired such as to troubleshoot a particular issue within a network. Test results which may measure various network metrics will typically be collected during testing, diagnosis, or both and may be used to conduct further testing or to identify the cause of anomalous network behavior.

Though generally described herein as being used in connection with one or more improved communication channels between one or more front-end and one or more back-end computers, it is noted that the systems and methods for testing and diagnosis, as described herein, may be used with a variety of networks.

In one or more embodiments, the invention includes testing and diagnosis for one or more improved communication channels implemented through a public network such as the Internet. These improvements are enabled by using front-end and back-end servers, typically implemented as web servers, that are located within the network. It is difficult to define a clear demarcation point for what mechanisms are "in the network" in contrast with mechanisms "outside of the network". Typically, devices outside the network, such as clients and servers, establish a channel through the network with each other. Using the OSI network model referenced above, all of the software and hardware mechanisms below the "network" protocol layer in the OSI model in the client and server computers can be considered within the network. Similarly processes and mechanisms that operate above the network level in the client and server can be considered "outside the network".

Given the terminology framework above, certain features of the present invention involve implementing processes that provide higher-layer services within the network. For example, services typically associated with the "presentation layer" or "application layer" such as compression and encryption are implemented within the network. In accordance with the present invention, these higher-layer processes are implemented between machines within the network in a manner that is preferably transparent to the computers outside the network. In this manner, so long as a common semantic is defined for a pair or set of machines within the network, it is not necessary to modify clients, servers, or other infrastructure components such as routers to recognize the semantic used to provide these higher-layer functions.

A first set of inventions relate to the improved functionality and metrics available when cooperating front-end and back-end servers are used to transport data through the public network. This first class of inventions enable an enhanced communication channel in which both ends can be synchronized and so easily know when the other end performed specific operations such as datagram generation and transmission. This enables each side to take actions based on the knowledge that was previously only available to the transmitting side. Other functionality includes compression of traffic between front-end and back-end using public or proprietary compression mechanisms that can be readily selected and optimized for the particular content data currently being transported. Similarly, encryption/decryption mechanisms can be employed between the front-end and back-end for enhanced security without impacting either a web server or a web client that are principles of the transaction. Forward error correction can be used to reduce the quantity of traffic, improve latency, and/or increase speed of the transport between front-end and back-end components.

A second set of inventions relates to performance and functionality improvements enabled by implementing the front-end and back-end computers as dynamically re-configurable elements. This second class of inventions enables multiple front-ends to connect with and service multiple back-ends and/or one or more web servers or web sites. These inventions also include the ability for one front-end to service multiple back-ends and by extension multiple web servers or web sites. Similarly, one front-end can service multiple web servers or content providers directly.

In one aspect, the present invention involves a system for multiplexing data from a plurality of links or channels onto a shared bandwidth channel. The plurality of links may be fixed-bandwidth links, or may themselves be shared bandwidth links. The plurality of links may comprise a homogenous user-level protocol, such as HTTP, or may comprise a variety of user level protocols such as HTTP, FTP, NNTP, SMTP and the like. The plurality of links may similarly comprise homogenous network-layer and/or physical layer protocols, or may comprise a varied set of network-layer and physical layer protocols.

The shared bandwidth channel allows a variety of services to be provided. Some advantages are achieved simply by multiplexing multiple links onto a single channel. This combination enables the single channel to be persistent thereby avoiding overhead associated with setting up, maintaining and breaking down connections that would otherwise be required of each the multiple links. The single shared channel can also include more information than the protocols of the plurality of links allow such as time synchronization information and quality of service information.

In a particular embodiment, the shared bandwidth channel transports packets that are composed by selecting data from the plurality of links in an order and rate determined to provide differential levels of service between packets. The differential service levels may mean that some of the data are transported with lower latency and/or higher quality of service than other data. The criteria for providing differential levels of service are not limited, but in particular embodiments are based on content type, user identity, user history, and session statistics.

The present invention is illustrated and described in terms of a distributed computing environment such as an enterprise computing system using public communication channels such as the Internet. However, an important feature of the present invention is that it is readily scaled upwardly and downwardly to meet the needs of a particular application. Accordingly, unless specified to the contrary, the present invention is applicable to significantly larger, more complex network environments, including wireless network environments, as well as small network environments such as conventional LAN systems.

The present invention is particularly useful in applications where there is a large amount of data communicated between web servers and web clients (i.e., browser software) or where timeliness (e.g., low latency transport) is important. For example, real-time stock quotes, multi-player games, multi-tiered service to ASP (application service provider) software distribution models benefit from the improvements provided by the present invention. Although the present invention will be described in terms of particular applications, these examples are provided to enhance understanding and are not a limitation of the essential teachings of the present invention.

For purposes of this document, a web server is a computer running server software coupled to the World Wide Web (i.e., "the web") that delivers or serves web pages. The web server has a unique IP address and accepts connections in order to service requests by sending back responses. A web server differs from a proxy server or a gateway server in that a web server has resident a set of resources (i.e., software programs, data storage capacity, and/or hardware) that enable it to execute programs to provide an extensible range of functionality such as generating web pages, accessing remote network resources, analyzing contents of packets, reformatting request/response traffic and the like using the resident resources. In contrast, a proxy simply forwards request/response traffic on behalf of a client to resources that reside elsewhere, or obtains resources from a local cache if implemented. A web server in accordance with the present invention may reference external resources of the same or different type as the services requested by a user, and reformat and augment what is provided by the external resources in its response to the user. Commercially available web server software includes Microsoft Internet Information Server (IIS), Netscape Netsite, Apache, among others. Alternatively, a web site may be implemented with custom or semi-custom software that supports HTTP traffic.

FIG. 1 shows an exemplary computing environment 100 in which the present invention may be implemented. Environment 100 includes a plurality of local networks such as Ethernet network 102, FDDI network 103 and Token Ring network 104. Essentially, a number of computing devices and groups of devices are interconnected through a network 101. For example, local networks 102, 103 and 104 are each coupled to network 101 through routers 109. LANs 102, 103 and 104 may be implemented using any available topology and may implement one or more server technologies including, for example UNIX, Novell, or Windows NT networks, or peer-to-peer type network. Each network will include distributed storage implemented in each device and typically includes some mass storage device coupled to or managed by a server computer. Network 101 comprises, for example, a public network such as the Internet or another network mechanism such as a fibre channel fabric or conventional WAN technologies.

Local networks 102, 103 and 104 include one or more network appliances 107. One or more network appliances 107 may be configured as an application and/or file server. Each local network 102, 103 and 104 may include a number of shared devices (not shown) such as printers, file servers, mass storage and the like. Similarly, devices 111 may be shared through network 101 to provide application and file services, directory services, printing, storage, and the like. Routers 109 provide a physical connection between the various devices through network 101. Routers 109 may implement desired access and security protocols to manage access through network 101.

Network appliances 107 may also couple to network 101 through public switched telephone network 108 using copper or wireless connection technology. In a typical environment, an Internet service provider 106 supports a connection to network 101 as well as PSTN 108 connections to network appliances 107.

Network appliances 107 may be implemented as any kind of network appliance having sufficient computational function to execute software needed to establish and use a connection to network 101. Network appliances 107 may comprise workstation and personal computer hardware executing commercial operating systems such as Unix variants, Microsoft Windows, Macintosh OS, and the like. At the same time, some appliances 107 comprise portable or handheld devices using wireless connections through a wireless access provider such as personal digital assistants and cell phones executing operating system software such as PalmOS, WindowsCE, EPOCOS, and the like. Moreover, the present invention is readily extended to network devices such as office equipment, vehicles, and personal communicators that make occasional connection through network 101.

Each of the devices shown in FIG. 1 may include memory, mass storage, and a degree of data processing capability sufficient to manage their connection to network 101. The computer program devices in accordance with the present invention are implemented in the memory of the various devices shown in FIG. 1 and enabled by the data processing capability of the devices shown in FIG. 1. In addition to local memory and storage associated with each device, it is often desirable to provide one or more locations of shared storage such as disk farm (not shown) that provides mass storage capacity beyond what an individual device can efficiently use and manage. Selected components of the present invention may be stored in or implemented in shared mass storage.

Figure 2:
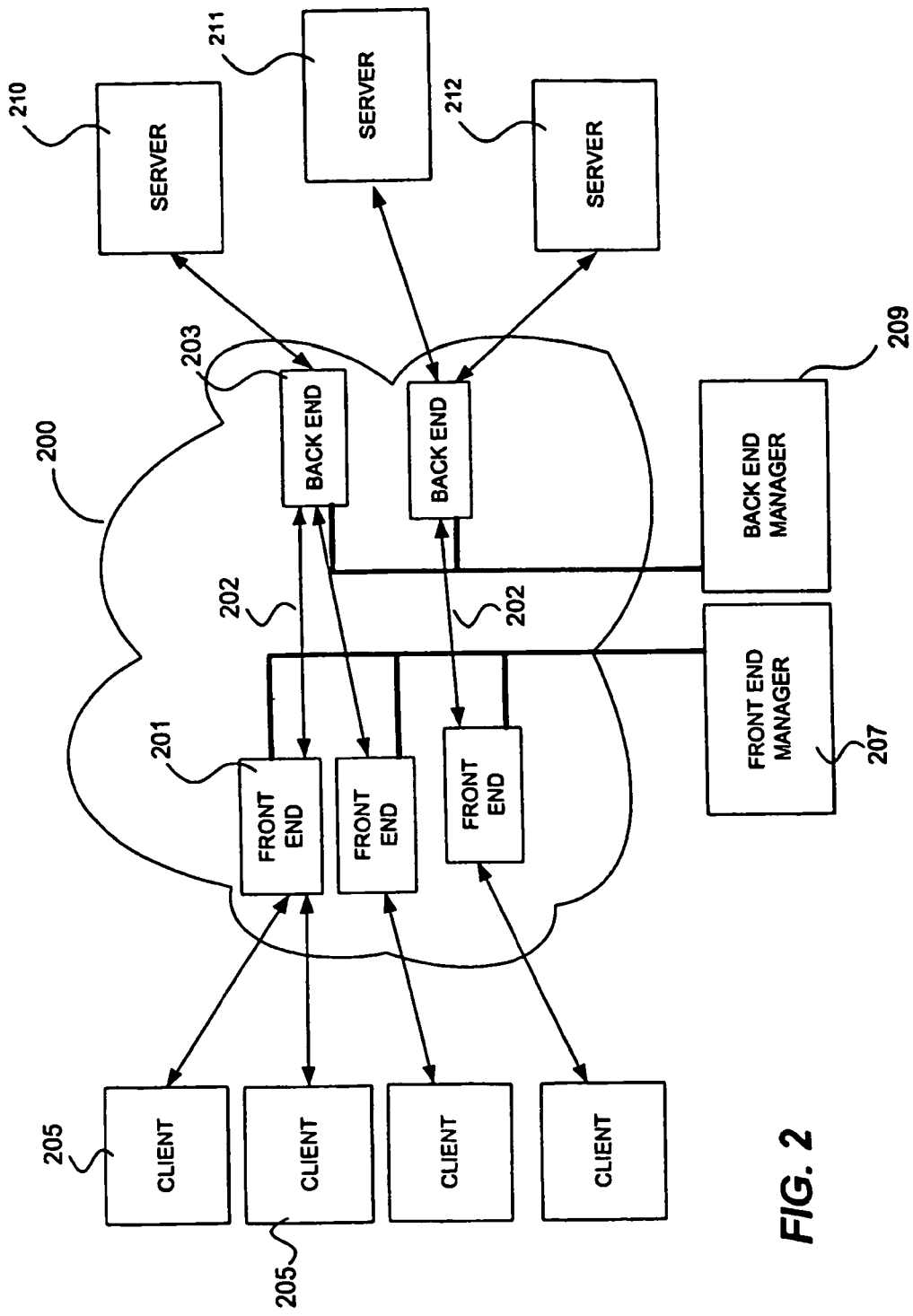
FIG. 2 illustrates in block-diagram form entity relationships in a system in accordance with the present invention.

The present invention operates in a manner akin to a private network 200 implemented within the Internet infrastructure as shown in FIG. 2. Private network 200 enhances communications between a client 205 and a web site 210 by implementing any of a variety of processes that enhance efficiency and/or functionality independently of client 205 and/or server 210. These processes include time synchronization processes, quality of service management processes, compression processes, security processes, and error correction processes.

In the specific examples herein client 205 comprises a network-enabled graphical user interface such as a web browser. However, the present invention is readily extended to client software other than conventional web browser software. Any client application that can access a standard or proprietary user level protocol for network access is a suitable equivalent. Examples include client applications for file transfer protocol (FTP) services, voice over Internet protocol (VoIP) services, network news protocol (NNTP) services, multi-purpose internet mail extensions (MIME) services, post office protocol (POP) services, simple mail transfer protocol (SMTP) services, as well as Telnet services. In addition to network protocols, the client application may access a network application such as a database management system (DBMS) in which case the client application generates query language (e.g., structured query language or "SQL") messages. In wireless appliances, a client application may communicate via a wireless application protocol or the like.

For convenience, the term "web site" is used interchangeably with "web server" in the description herein although it should be understood that a web site comprises a collection of content, programs and processes implemented on one or more web servers. A web site is owned by the content provider such as an e-commerce vendor whereas a web server refers to set of programs running on one or more machines coupled to an Internet node. The web site 210 may be hosted on the site owner's own web server, or hosted on a web server owned by a third party. A web hosting center is an entity that implements one or more web sites on one or more web servers using shared hardware and software resources across the multiple web sites. In a typical web infrastructure, there are many web browsers, each of which has a TCP connection to the web server in which a particular web site is implemented. The present invention adds two components to the infrastructure: a front-end 201 and back-end 203. Front-end 201 and back-end 203 are coupled by a managed data communication link 202 that forms, in essence, a private network.

Front-end mechanism 201 serves as an access point for client-side communications. In the process of translating a requested domain name into an IP address of a particular server hosting the requested domain name, mechanisms described in reference to FIG. 3 operate to select a particular front-end mechanism 201. In effect, the domain is dynamically assigned to the selected front-end mechanism. More than one front-end 201 may host a single domain. So long as a client 205 associates the domain name with the IP address of the selected front-end 201, all client requests to the domain will be routed to the selected front-end 201.

Front-end mechanism 201 implements a set of processes in the dynamically assigned domain that implement a gateway that functions as a substitute for the web server(s) implementing web site 210 (i.e., from the perspective of client 205, front-end 201 appears to be the web site 210). Front-end 201 comprises, for example, a computer that sits "close" to clients 205. By "close", it is meant that the average latency associated with a connection between a client 205 and a front-end 201 is less than the average latency associated with a connection between a client 205 and a web site 210. Desirably, front-end computers have as fast a connection as possible to the clients 205. For example, the fastest available connection may be implemented in a point of presence (POP) of an Internet service provider (ISP) 106 used by a particular client 205. However, the placement of the front-ends 201 can limit the number of browsers that can use them. Because of this, in some applications it is more practical to place one front-end computer in such a way that several POPs can connect to it. Greater distance between front-end 201 and clients 205 may be desirable in some applications as this distance will allow for selection amongst a greater number front-ends 201 and thereby provide significantly different routes to a particular back-end 203. This may offer benefits when particular routes and/or front-ends become congested or otherwise unavailable.

Transport mechanism 202 is implemented by cooperative actions of the front-end 201 and back-end 203. Back-end 203 processes and directs data communication to and from web site 210. Transport mechanism 202 communicates data packets using a proprietary protocol called Transport Morphing Protocol™ or TMP™. Transport morphing protocol and TMP are trademarks or registered trademarks of Circadence Corporation in the United States and other countries. TMP is implemented over the public Internet infrastructure in the particular example. Hence, the present invention does not require heavy infrastructure investments and automatically benefits from improvements implemented in the general purpose network 101. Unlike the general purpose Internet, front-end 201 and back-end 203 are programmably assigned to serve accesses to a particular web site 210 at any given time.

It is contemplated that any number of front-end and back-end mechanisms may be implemented cooperatively to support the desired level of service required by the web site owner. The present invention implements a many-to-many mapping of front-ends to back-ends. Because the front-end to back-end mappings can be dynamically changed, a fixed hardware infrastructure can be logically reconfigured to map more or fewer front-ends to more or fewer back-ends and web sites or servers as needed.

Front-end 201 together with back-end 203 function to reduce traffic across the TMP link 202 and to improve response time for selected browsers. Traffic across the TMP link 202 is reduced, for example, by compressing data. Compression can be implemented using any available compression mechanism and may operate on a packet-by-packet level or by assembling data from multiple packets to compress across a larger data set. Although compression may be applied equally to all data, it is known that some types of data do not benefit from compression. It is also known that certain compression mechanisms and algorithms are better suited for particular types of data. Accordingly, the present invention contemplates the dynamic selection of a compression mechanism based on the type of data being processed. For example, HTML data, which makes up a large proportion of web-based traffic, typically includes ASCII text which is known to compress well using, for example, compressed HTML mechanisms. Encrypted data, however, often does not compress well. Accordingly, the present invention may be implemented to apply compressed HTML techniques to HTML packets while passing encrypted packets (e.g., packets using a secure HTTP scheme) without attempting encryption. So long as front-end 201 and back-end 203 share a common semantic for performing the compression/decompression processes, any available algorithm may be implemented.

Encryption processes are largely analogous to compression processes in that they may be implemented by a number of available cipher algorithms and mechanisms including stream ciphers and block ciphers providing various levels of data security. It usually is not valuable to encrypt data that is already encrypted, hence it is contemplated that encryption may be selectively applied. Moreover, a vast majority of data transferred in many applications does not require encryption at all. The particular encryption mechanism used by the front-end 201 and back-end 203 can be selected based upon the type of data, or designated on a file-by-file basis by a manager of server 210, for example. Front-end 201 and back-end 203 must share a common encryption/decryption semantic, however.

In one embodiment, front-end 201 and back-end 203 share operational information such as time synchronization and quality of service metrics with each other. This information is readily communicated by specially designated packets transmitted on TMP link 202, and/or by including a portion of each TMP packet that is used to exchange this operational information. Traffic across link 202 is preferably managed by selectively transmitting packets at a rate determined to provide adequate quality of service and suitable packet delivery time using this knowledge shared between the front-end 201 and back-end 203. Optionally, this operational information can be shared with processes running on client 205 and/or server 210 as well, although such sharing would require special configuration of client 205 and/or server 210 and is not required to achieve the benefits of the present invention.

Traffic may be further reduced by using forward error correction (FEC) techniques to compensate for lossy connections. A variety of FEC techniques are known that add various amounts of overhead to the traffic. The selection of a particular method depends on the quality of service (i.e., transit times and packet loss rate and/or bit error rate) of the communication channel being used. In one implementation, a statically defined FEC mechanism can be implemented between front-end 201 and back-end 203 based on average or worst-case quality of service (QoS). However, because both front-end 201 and back-end 203 have knowledge of the QoS metrics of each other and are time synchronized, it is contemplated that the FEC mechanisms can be adaptive to current QoS metrics. For example, a data packets may be encoded with a 1-bit/byte error correction code during times of high QoS, and dynamically changed to a 3-bit/byte or 4-bit/byte error correction (or higher) encoding when QoS degrades. So long as front-end 201 and back-end 203 share a common semantic for handling the FEC processes, the actual implementation of those processes is very flexible and can be dynamically defined.

The blending of request datagrams results in fewer request:acknowledge pairs across the TMP link 202 as compared to the number required to send the packets individually between front-end 201 and back-end 203. This action reduces the overhead associated with transporting a given amount of data, although conventional request:acknowledge traffic is still performed on the links coupling the front-end 201 to client 205 and back-end 203 to a web server. Moreover, resend traffic is significantly reduced further reducing the traffic. Response time is further improved for select privileged users and for specially marked resources by determining the priority for each HTTP transmission.

In one embodiment, front-end 201 and back-end 203 are closely coupled to the Internet backbone. This means they have high bandwidth connections, can expect fewer hops, and have more predictable packet transit time than could be expected from a general-purpose connection. Although it is preferable to have low latency connections between front-ends 201 and back-ends 203, a particular strength of the present invention is its ability to deal with latency by enabling efficient transport and traffic prioritization. Hence, in other embodiments front-end 201 and/or back-end 203 may be located farther from the Internet backbone and closer to clients 205 and/or web servers 210. Such an implementation reduces the number of hops required to reach a front-end 201 while increasing the number of hops within the TMP link 202 thereby yielding control over more of the transport path to the management mechanisms of the present invention.

Clients 205 no longer conduct all data transactions directly with the web server 210. Instead, clients 205 conduct some and preferably a majority of transactions with front-ends 201, which simulate the functions of web server 210. Client data is then sent, using TMP link 202, to the back-end 203 and then to the web server 210. Running multiple clients 205 over one large connection provides several advantages:

Since all client data is mixed, each client can be assigned a priority. Higher priority clients, or clients requesting higher priority data, can be given preferential access to network resources so they receive access to the channel sooner while ensuring low-priority clients receive sufficient service to meet their needs.

The large connection between a front-end 201 and back-end 203 can be permanently maintained, shortening the many TCP/IP connection sequences normally required for many clients connecting and disconnecting.

Services such as encryption, compression, error correction and time synchronization that may not be available or efficiently implemented in particular clients 205 can be practically implemented in TMP link where the resources required to provide these services are shared across multiple clients 205.

Using a proprietary protocol allows the use of more effective techniques to improve data throughput and makes better use of existing bandwidth during periods when the network is congested.

A particular advantage of the architecture shown in FIG. 2 is that it is readily scaled. Any number of client machines 205 may be supported. In a similar manner, a web site owner may choose to implement a site using multiple web servers 210 that are co-located or distributed throughout network 101. To avoid congestion, additional front-ends 201 may be implemented or assigned to particular web sites. Each front-end 201 is dynamically re-configurable by updating address parameters to serve particular web sites. Client traffic is dynamically directed to available front-ends 201 to provide load balancing. Hence, when quality of service drops because of a large number of client accesses, an additional front-end 201 can be assigned to the web site and subsequent client requests directed to the newly assigned front-end 201 to distribute traffic across a broader base.

In the particular examples, this is implemented by a front-end manager component 207 that communicates with multiple front-ends 201 to provide administrative and configuration information to front-ends 201. Each front-end 201 includes data structures for storing the configuration information, including information identifying the IP addresses of web servers 210 to which they are currently assigned. Other administrative and configuration information stored in front-end 201 may include information for prioritizing data from and to particular clients, quality of service information, and the like.

Similarly, additional back-ends 203 can be assigned to a web site to handle increased traffic. Back-end manager component 209 couples to one or more back-ends 203 to provide centralized administration and configuration service. Back-ends 203 include data structures to hold current configuration state, quality of service information and the like. In the particular examples front-end manager 207 and back-end manager 209 serve multiple web sites 210 and so are able to manipulate the number of front-ends and back-ends assigned to each web site 210 by updating this configuration information. When the congestion for the site subsides, the front-end 201 and back-end 203 can be reassigned to other, busier web sites. These and similar modifications are equivalent to the specific examples illustrated herein.

In the case of web-based environments, front-end 201 is implemented using custom or off-the-shelf web server software. Front-end 201 is readily extended to support other, non-web-based protocols, however, and may support multiple protocols for varieties of client traffic. Front-end 201 processes the data traffic it receives, regardless of the protocol of that traffic, to a form suitable for transport by TMP 202 to a back-end 203. Hence, most of the functionality implemented by front-end 201 is independent of the protocol or format of the data received from a client 205. Hence, although the discussion of the exemplary embodiments herein relates primarily to front-end 201 implemented as a web server, it should be noted that, unless specified to the contrary, web-based traffic management and protocols are merely examples and not a limitation of the present invention.

As shown in FIG. 2, in accordance with the present invention a web site is implemented using an originating web server 210 operating cooperatively with the web server of front-end 201. More generally, any network service (e.g., FTP, VoIP, NNTP, MIME, SMTP, Telnet, DBMS) can be implemented using a combination of an originating server working cooperatively with a front-end 201 configured to provide a suitable interface (e.g., FTP, VoIP, NNTP, MIME, SMTP, Telnet, DBMS, WAP) for the desired service. In contrast to a simple front-end cache or proxy software, implementing a server in front-end 201 enables portions of the web site (or other network service) to actually be implemented in and served from both locations. The actual web pages or service being delivered comprises a composite of the portions generated at each server. Significantly, however, the web server in front-end 201 is close to the browser in a client 205 whereas the originating web server is close to all resources available at the web hosting center at which web site 210 is implemented. In essence the web site 210 is implemented by a tiered set of web servers comprising a front-end server 201 standing in front of an originating web server.

This difference enables the web site or other network service to be implemented so as to take advantage of the unique topological position each entity has with respect to the client 205. By way of a particular example, consider an environment in which the front-end server 201 is located at the location of an ISP used by a particular set of clients 205 and back-end 203 is closely coupled by a private channel to server 210. In such an environment, clients 205 can access the front-end server 205 without actually traversing the network 101, hence the need for encryption and error correction and time synchronization services are relaxed with respect to the client-to-front-end link. In such cases the services provided transparently by enhanced channel 202 are substantially a complete substitute for prior services implemented by modifying client 205 and server 210 themselves.

Figure 3:
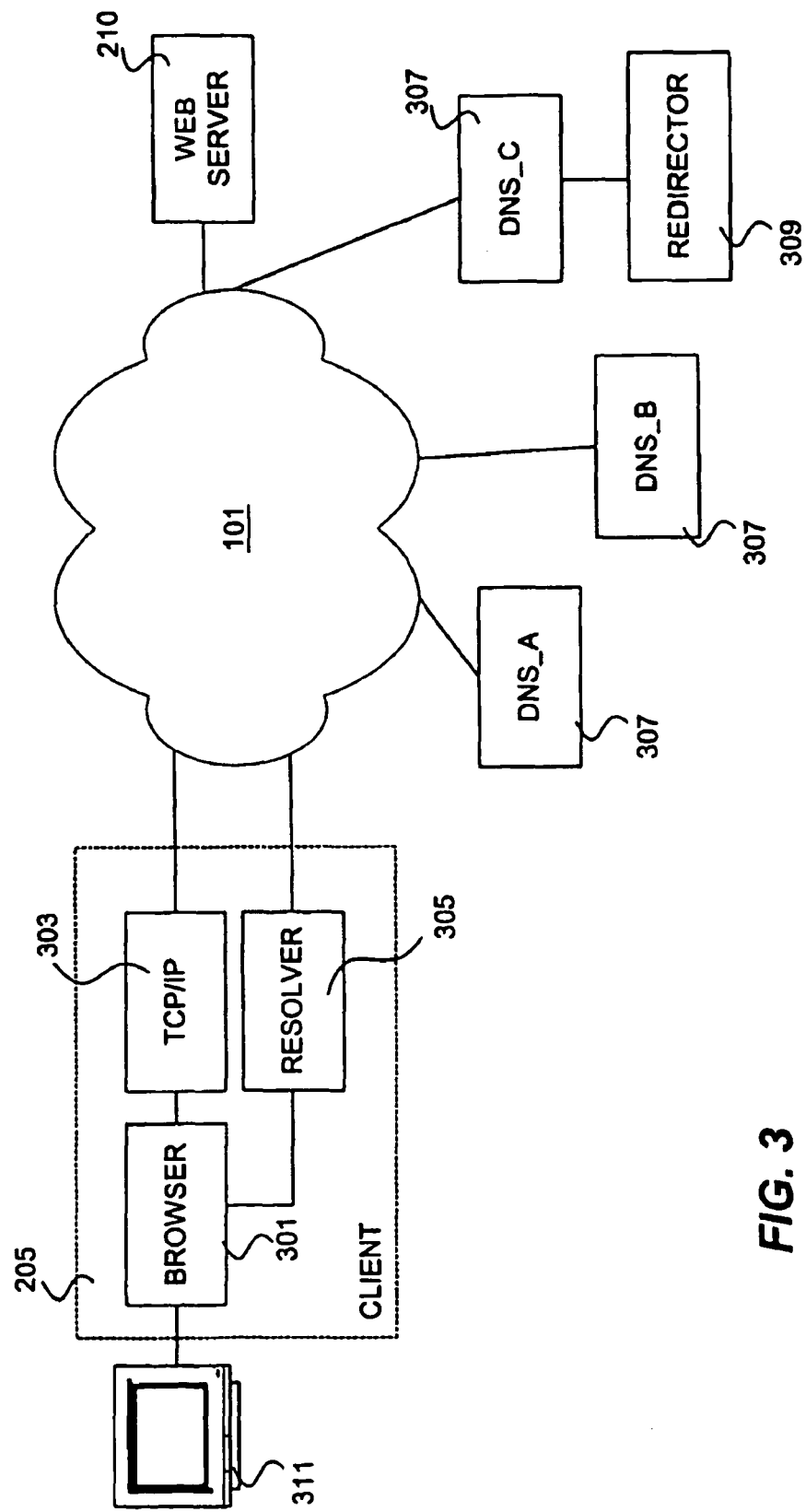
FIG. 3 illustrates a domain name system used in an implementation of the present invention.

In order for a client 205 to obtain service from a front-end 201, it must first be directed to a front-end 201 that can provide the desired service. Preferably, client 205 does not need to be aware of the location of front-end 201, and initiates all transactions as if it were contacting the originating server 210. FIG. 3 illustrates a domain name server (DNS) redirection mechanism that illustrates how a client 205 is connected to a front-end 201. The DNS systems is defined in a variety of Internet Engineering Task Force (IETF) documents such as RFC0883, RFC 1034 and RFC 1035 which are incorporated by reference herein. In a typical environment, a client 205 executes a browser 301, TCP/IP stack 303, and a resolver 305. For reasons of performance and packaging, browser 301, TCP/IP stack 303 and resolver 305 are often grouped together as routines within a single software product.

Browser 301 functions as a graphical user interface to implement user input/output (I/O) through monitor 311 and associated keyboard, mouse, or other user input device (not shown). Browser 301 is usually used as an interface for web-based applications, but may also be used as an interface for other applications such as email and network news, as well as special-purpose applications such as database access, telephony, and the like. Alternatively, a special-purpose user interface may be substituted for the more general-purpose browser 301 to handle a particular application.

TCP/IP stack 303 communicates with browser 301 to convert data between formats suitable for browser 301 and IP format suitable for Internet traffic. TCP/IP stack also implements a TCP protocol that manages transmission of packets between client 205 and an Internet service provider (ISP) or equivalent access point. IP protocol requires that each data packet include, among other things, an IP address identifying a destination node. In current implementations the IP address comprises a 32-bit value that identifies a particular Internet node. Non-IP networks have similar node addressing mechanisms. To provide a more user-friendly addressing system, the Internet implements a system of domain name servers that map alpha-numeric domain names to specific IP addresses. This system enables a name space that is more consistent reference between nodes on the Internet and avoids the need for users to know network identifiers, addresses, routes and similar information in order to make a connection.

The domain name service is implemented as a distributed database managed by domain name servers (DNSs) 307 such as DNS_A, DNS_B and DNS_C shown in FIG. 3. Each DNS relies on <domain name:IP> address mapping data stored in master files scattered through the hosts that use the domain system. These master files are updated by local system administrators. Master files typically comprise text files that are read by a local name server, and hence become available through the name servers 307 to users of the domain system.

The user programs (e.g., clients 205) access name servers through standard programs such as resolver 305. Resolver 305 includes an address of a DNS 307 that serves as a primary name server. When presented with a reference to a domain name (e.g., http://www.circadence.com), resolver 305 sends a request to the primary DNS (e.g., DNS_A in FIG. 3). The primary DNS 307 returns either the IP address mapped to that domain name, a reference to another DNS 307 which has the mapping information (e.g., DNS_B in FIG. 3), or a partial IP address together with a reference to another DNS that has more IP address information. Any number of DNS-to-DNS references may be required to completely determine the IP address mapping.

In this manner, the resolver 305 becomes aware of the IP address mapping which is supplied to TCP/IP component 303. Client 205 may cache the IP address mapping for future use. TCP/IP component 303 uses the mapping to supply the correct IP address in packets directed to a particular domain name so that reference to the DNS system need only occur once.

In accordance with the present invention, at least one DNS server 307 is owned and controlled by system components of the present invention. When a user accesses a network resource (e.g., a web site), browser 301 contacts the public DNS system to resolve the requested domain name into its related IP address in a conventional manner. In a first embodiment, the public DNS performs a conventional DNS resolution directing the browser to an originating server 210 and server 210 performs a redirection of the browser to the system owned DNS server (i.e., DNC_C in FIG. 3). In a second embodiment, domain:address mappings within the DNS system are modified such that resolution of the of the originating server's domain automatically return the address of the system-owned DNS server (DNS_C). Once a browser is redirected to the system-owned DNS server, it begins a process of further redirecting the browser 301 to the best available front-end 201.

Unlike a conventional DNS server, however, the system-owned DNS_C in FIG. 3 receives domain:address mapping information from a redirector component 309. Redirector 309 is in communication with front-end manager 207 and back-end manager 209 to obtain information on current front-end and back-end assignments to a particular server 210. A conventional DNS is intended to be updated infrequently by reference to its associated master file. In contrast, the master file associated with DNS_C is dynamically updated by redirector 309 to reflect current assignment of front-end 201 and back-end 203. In operation, a reference to web server 210 (e.g., http://www.circadence.com) may result in an IP address returned from DNS_C that points to any selected front-end 201 that is currently assigned to web site 210. Likewise, web site 210 may identify a currently assigned back-end 203 by direct or indirect reference to DNS_C.

Front-end 201 typically receives information directly from front-end manager 207 about the address of currently assigned back-ends 203. Similarly, back-end 203 is aware of the address of a front-end 201 associated with each data packet. Hence, reference to the domain system is not required to map a front-end 201 to its appropriate back-end 203.

Figure 4:
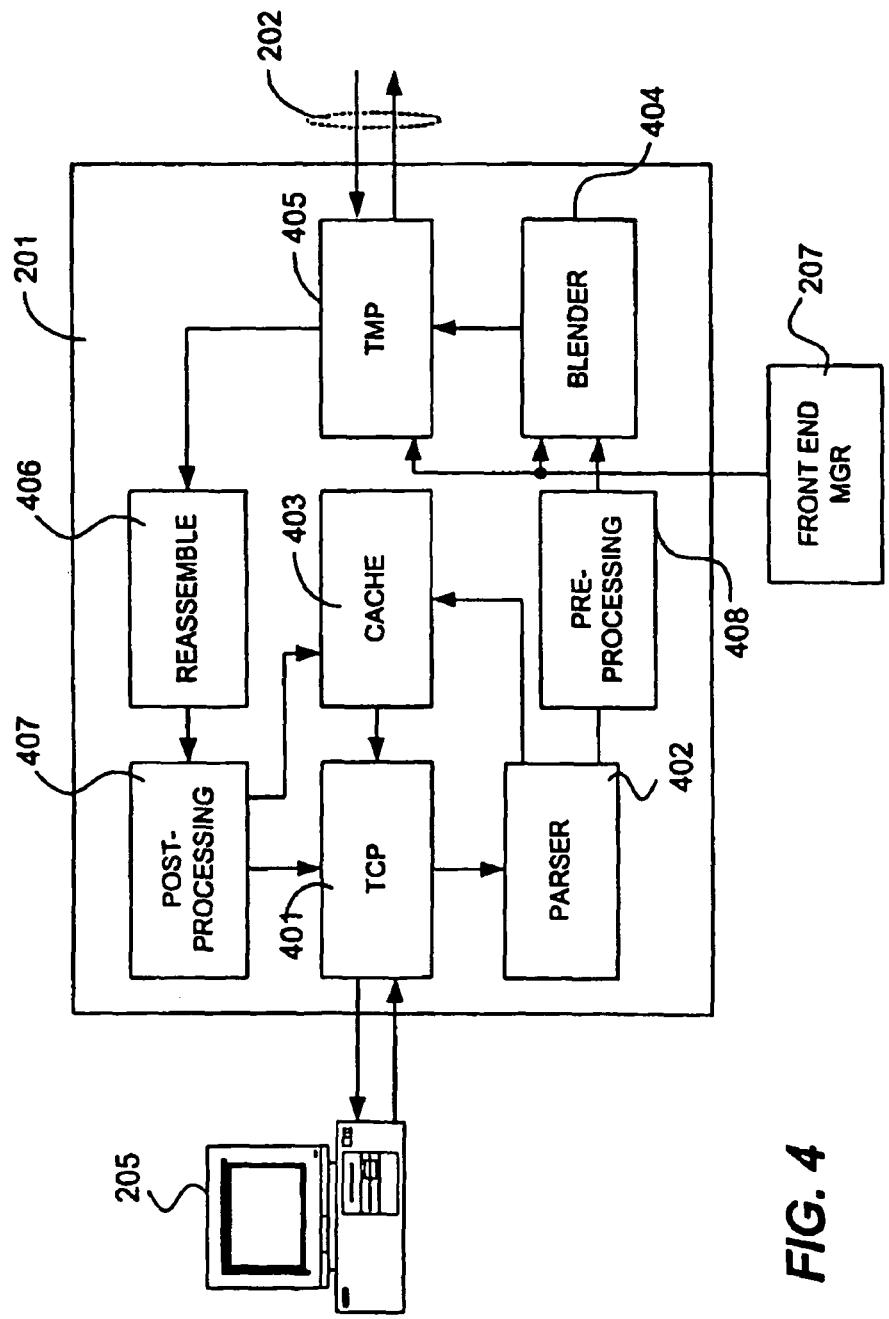
FIG. 4 illustrates front-end components of FIG. 2 in greater detail.

FIG. 4 illustrates principle functional components of an exemplary front-end 201 in greater detail. Primary functions of the front-end 201 include translating transmission control protocol (TCP) packets from client 205 into TMP packets used in the system in accordance with the present invention. It is contemplated that various functions described in reference to the specific examples may be implemented using a variety of data structures and programs operating at any location in a distributed network. For example, a front-end 201 may be operated on a network appliance 107 or server within a particular network 102, 103, or 104 shown in FIG. 1.

TCP component 401 includes devices for implementing physical connection layer and Internet protocol (IP) layer functionality. Current IP standards are described in IETF documents RFC0791, RFC0950, RFC0919, RFC0922, RFC792, RFC1112 that are incorporated by reference herein. For ease of description and understanding, these mechanisms are not described in great detail herein. Where protocols other than TCP/IP are used to couple to a client 205, TCP component 401 is replaced or augmented with an appropriate network protocol process.

TCP component 401 communicates TCP packets with one or more clients 205. Received packets are coupled to parser 402 where the Internet protocol (or equivalent) information is extracted. TCP is described in IETF RFC0793 which is incorporated herein by reference. Each TCP packet includes header information that indicates addressing and control variables, and a payload portion that holds the user-level data being transported by the TCP packet. The user-level data in the payload portion typically comprises a user-level network protocol datagram.

Parser 402 analyzes the payload portion of the TCP packet. In the examples herein, HTTP is employed as the user-level protocol because of its widespread use and the advantage that currently available browser software is able to readily use the HTTP protocol. In this case, parser 402 comprises an HTTP parser. More generally, parser 402 can be implemented as any parser-type logic implemented in hardware or software for interpreting the contents of the payload portion. Parser 402 may implement file transfer protocol (FTP), mail protocols such as simple mail transport protocol (SMTP), structured query language (SQL) and the like. Any user-level protocol, including proprietary protocols, may be implemented within the present invention using appropriate modification of parser 402.

To improve performance, front-end 201 optionally includes a caching mechanism 403. Cache 403 may be implemented as a passive cache that stores frequently and/or recently accessed web pages or as an active cache that stores network resources that are anticipated to be accessed. In non-web applications, cache 403 may be used to store any form of data representing database contents, files, program code, and other information. Upon receipt of a TCP packet, HTTP parser 402 determines if the packet is making a request for data within cache 403. If the request can be satisfied from cache 403, the data is supplied directly without reference to web server 210 (i.e., a cache hit). Cache 403 implements any of a range of management functions for maintaining fresh content. For example, cache 403 may invalidate portions of the cached content after an expiration period specified with the cached data or by web sever 210. Also, cache 403 may proactively update the cache contents even before a request is received for particularly important or frequently used data from web server 210. Cache 403 evicts information using any desired algorithm such as least recently used, least frequently used, first in/first out, or random eviction. When the requested data is not within cache 403, a request is processed to web server 210, and the returned data may be stored in cache 403.

Several types of packets will cause parser 404 to forward a request towards web server 210. For example, a request for data that is not within cache 403 (or if optional cache 403 is not implemented) will require a reference to web server 210. Some packets will comprise data that must be supplied to web server 210 (e.g., customer credit information, form data and the like). In these instances, HTTP parser 402 couples to data blender 404.

In accordance with the present invention, front-end 201 implements security processes, compression processes, encryption processes, error correction processes and the like to condition the received data for improved transport performance and/or provide additional functionality. These processes may be implemented within pre-processing unit 408, or alternatively implemented within any of the functional components within front-end 201. Also, front-end 201 may implement a prioritization program to identify packets that should be given higher priority service. A prioritization program requires only that front-end 201 include a data structure associating particular clients 205 or particular TCP packet types or contents with a prioritization value. Based on the prioritization value, parser 402 may selectively implement such features as caching, encryption, security, compression, error correction and the like to improve performance and/or functionality. The prioritization value is provided by the owners of web site 210, for example, and may be dynamically altered, statically set, or updated from time to time to meet the needs of a particular application.

Blender 404 slices and/or coalesces the data portions of the received packets into a more desirable "TMP units" that are sized for transport through the TMP mechanism 212. The data portion of TCP packets may range in size depending on client 205 and any intervening links coupling client 205 to TCP component 401. Moreover, where compression is applied, the compressed data will vary in size depending on the compressibility of the data. Data blender 404 receives information from front-end manager 217 that enables selection of a preferable TMP packet size. Alternatively, a fixed TMP packet size can be set that yields desirable performance across TMP mechanism 212. Data blender 404 also marks the TMP units so that they can be re-assembled at the receiving end. Data blender 404 may also serve as a buffer for storing packets from all appliances 107 that are associated with front-end 201. In accordance with the present invention, data blender 404 may associate a prioritization value with each packet.

TMP mechanism implements a TMP protocol, described in greater detail hereinbelow, to communicate TMP packets. Received TMP packets include subpackets from multiple TCP connections. The data portions of subpackets are reassembled by reassemble mechanism 406 into a form suitable for return to the requesting client 205. For example, in an HTTP environment reassemble mechanism 406 creates HTTP response payloads akin to what would have been generated by an origin server 210.

Postprocessing mechanism 407 performs decompression, decryption, forward error correction and the like on packets received from a back-end 203. As described hereinafter with respect to FIG. 5, back-end 203 preferably includes pre-processing mechanisms 508 that are analogous to pre-processing mechanisms 408. Hence, post-processing mechanisms 407 restore the data to a form usable by a client 205 without additional processing. Accordingly, client 205 need not implement any of the pre-processing or post processing functions while still realizing the benefits of these processes.

Figure 5:
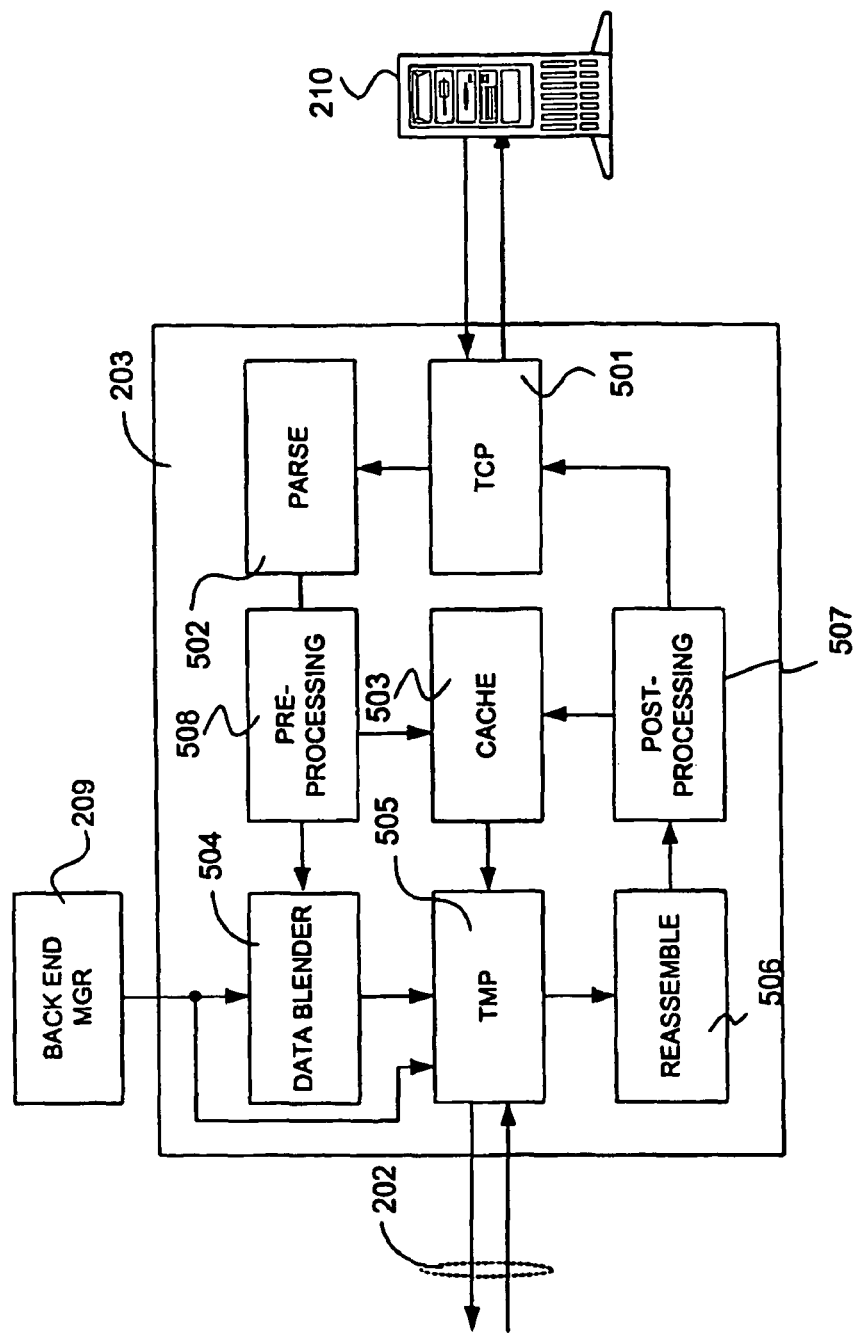
FIG. 5 illustrates back-end components of FIG. 2 in greater detail.

FIG. 5 illustrates principle functional components of an exemplary back-end 203 in greater detail. Primary functions of the back-end 203 include translating transmission control protocol (TCP) packets from web server 210 into TMP packets as well as translating TMP packets received from a front-end 201 into the one or more corresponding TCP packets to be send to server 210. Further, back-end 203 is able to implement similar or complementary functionality to that of front-end 203. In this manner, back-end 203 can operate as a web server to retrieve content and generate web pages, analyze and reformat web pages and components within web pages, and similar server functionality that would conventionally be implemented in a server 210. In general, any functionality and behavior described herein that can be implemented on server 210 and/or front-end server 201 can also be implemented on back-end server 203.

TMP unit 505 receives TMP packets from TMP pipe 212 and passes them to HTTP reassemble unit 507 where they are reassembled into the corresponding TCP packets. Data filter 506 may implement other functionality such as decompression, decryption, and the like to meet the needs of a particular application. The reassembled data is forwarded to TCP component 501 for communication with web server 210.

TCP data generated by the web server process are transmitted to TCP component 501 and forwarded to HTTP parse mechanism 502. Parser 502 operates in a manner analogous to parser 402 shown in FIG. 5 to extract the data portion from the received TCP packets. Pre-processing mechanism 508 and post-processing mechanism 507 operate in an analogous fashion to components 407 and 408 to perform compression, encryption, error correction, and the like, and forward those packets to data blender 504. Data blender 504 operates in a manner akin to data blender 404 shown in FIG. 5 to buffer and prioritize packets in a manner that is efficient for TMP transfer. Priority information is received by, for example, back-end manager 209 based upon criteria established by the web site owner. TMP data is streamed into TMP unit 505 for communication on TMP pipe 212.

Figure 6:
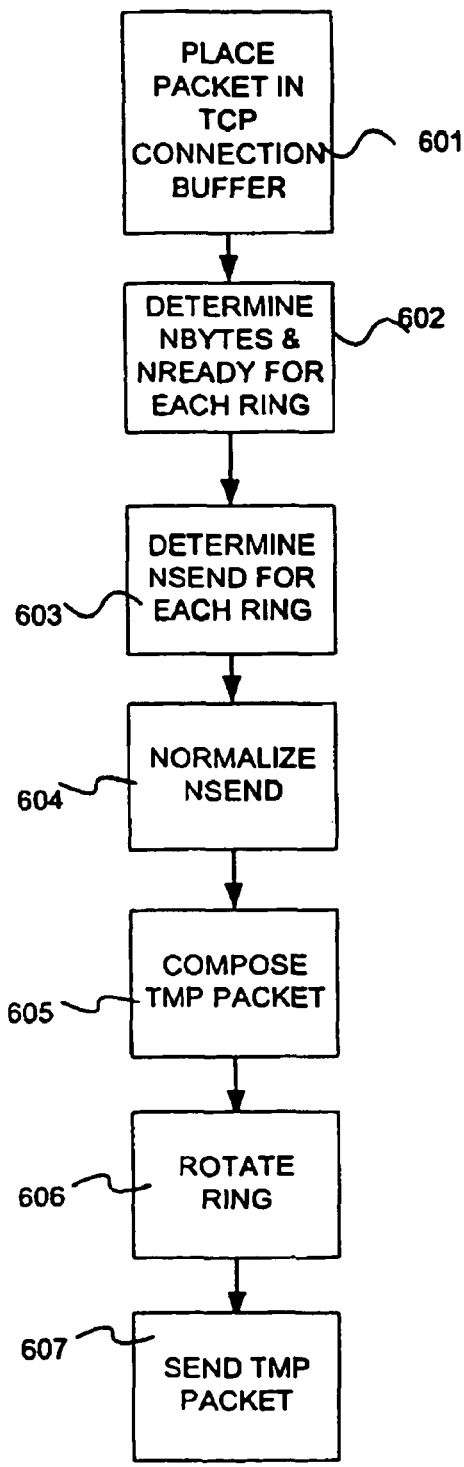
FIG. 6 illustrates in flow-diagram form processes involved in an exemplary implementation of the present invention.
Figure 7:
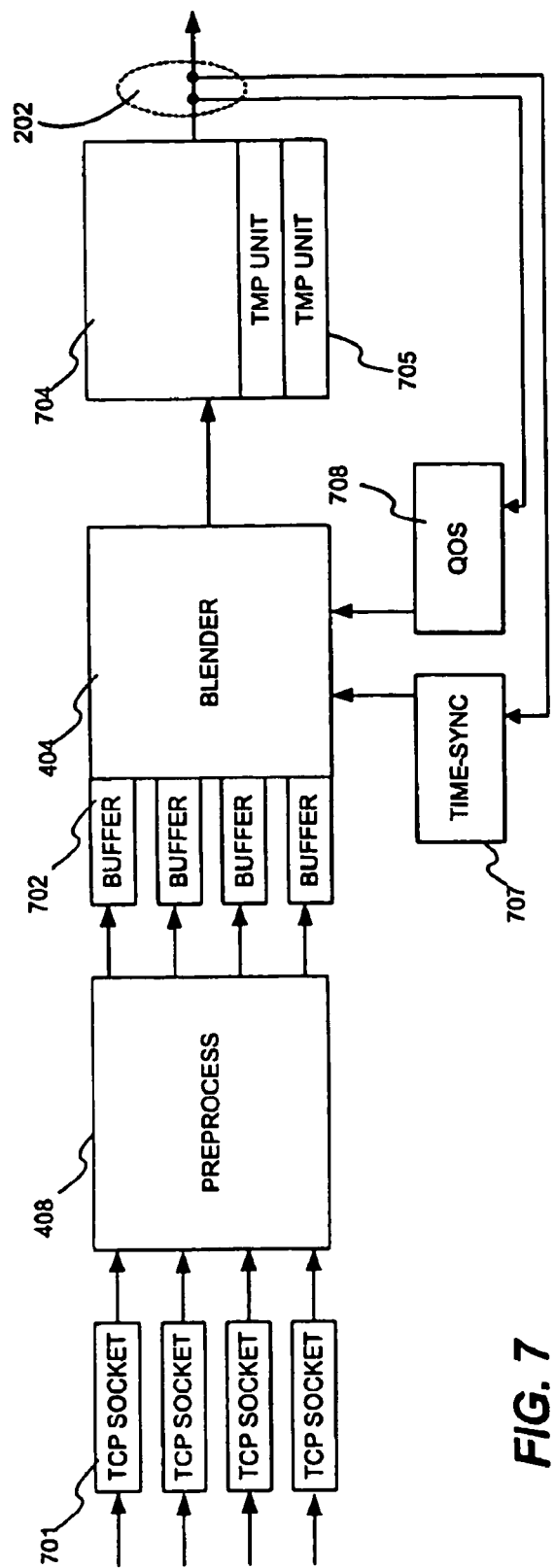
FIG. 7 illustrates a conceptual block diagram of particular components introduced in FIG. 2 in greater detail.

In an exemplary implementation, illustrated in FIG. 6 and FIG. 7, a "TMP connection" comprises a plurality of "TCP connection buffers", logically arranged in multiple "rings". Each TCP socket 701 maintained between the front-end 201 and a client 205 corresponds to a TCP connection buffer 702. Pre-processing 408 is performed on the TCP connection buffer data to provide, for example, data compression, encryption, and/or error correction coding before the data is placed in the corresponding TCP connection buffer 702.

When a TCP connection buffer 702 is created, it is assigned a priority. For purposes of the present invention, any algorithm or criteria may be used to assign a priority. Each priority ring is associated with a number of TCP connection buffers having similar priority. In a specific example, five priority levels are defined corresponding to five priority rings. Each priority ring is characterized by the number of connection buffers it holds (nSockets), the number of connection buffers it holds that have data waiting to be sent (nReady) and the total number of bytes of data in all the connection buffers that it holds (nBytes).

A TCP connection buffer 702 is created and placing one or more preprocessed packets from a TCP socket 701 within the TCP connection buffer 702. A TCP connection buffer 702 is sized to hold a plurality of TCP packets and each TCP connection buffer 702 is associated with a priority value. The priority value is assigned when TCP connection buffer 702 is first created and may be dynamically changed in operation.

When sending data, blender 404 performs a series of processes outlined in FIG. 6 that access data from the TCP connection buffers 702 to form TMP units 705 that are transmitted. The processes performed by blender 404 include:

In step 602, determine the number of bytes available to be sent from each ring (nBytes), and the number of TCP connections that are ready to send (nReady)

In step 603, determine how many bytes should be sent from each ring. This is based on a weight parameter for each priority. The weight can be thought of as the number of bytes that should be sent at each priority this time through the loop.

The nSend value computed in the previous step 603 reflects the weighted proportion that each ring will have in a blended TMP packet, but the values of nSend do not reflect how many bytes need to be selected to actually empty most or all of the data waiting to be sent a single round. To do this, the nSend value is normalized to the ring having the most data waiting (e.g., nBytes=nSendNorm) in step 604. This involves a calculation of a factor: S=nBytes/(Weight*nReady) for the ring with the greatest nReady. Then, for each ring, calculate nReady*S*Weight to get the normalized value (nSendNorm) for each priority ring.

In step 605, sub-packets are sent from the different rings. This is done, for example, by taking a sub-packet from the highest priority ring and adding it to a TMP packet, then adding a sub-packet from each of the top two queues, then the top three, and so on. A variety of algorithms may be used to select particular sub-packets from the different rings to implement a desired level of fairness, prioritization, and quality of service.

Referring to step 606, within each ring, sub-packets are added round robin. When a sub-packet is added from a TCP connection buffer the ring is rotated so the next sub-packet the ring adds will come from a different TCP connection buffer. Each sub-packet can be up to 512 bytes in a particular example. If the connection buffer has less than 512 bytes waiting, the data available is added to the TMP packet.

In step 607, when a full TMP packet (roughly 1.5 kB in a particular example) is built, it is sent. This can have three or more sub packets, depending on their size. The TMP packet will also be sent when there is no more data ready.

TMP unit 405 (shown in FIG. 4) and TMP unit 505 (shown in FIG. 5) implement the TMP protocol that communicates packets between front-end 201 and back-end 203. The protocol is rides on top of universal datagram protocol (UDP) in that network devices that handle TMP packets treat them as UDP packets. However, TMP packets differ from standard UDP packets in that they have additional unique header data defining a unique set of messages, outlined below, to support the TMP functionality. Also, the manner in which TMP packets are transferred onto the physical communication channel, referred to as the protocol behavior, differs significantly from TCP.

TMP packets have a header that contains packet control information. Some TMP packets also carry extra information in a data or payload portion. The packet control information includes, for example:
   A connection number (that identifies the connection to which it belongs)
   A checksum for data integrity
   A set of flags (which may be used or remain unused) for a variety of purposes
   A message type identifier
   The confirmed message type The rest of the packet header contains information or data which can differ between packets, depending on the message type.

A short list of messages that can be sent by the TMP protocol includes: data, acknowledgments, connection requests and replies, time synchronization requests and replies, resent data, control messages, QoS messages, status requests and replies, suspend messages, and alerts. Packet header content which is specific to the message type is as follows.
   Acknowledgment
      The last sequential confirmed sequence message
      The confirmed message sequence number
   Time Synchronization Request
      Requester time index
   Time Synchronization Reply
      The time that the request was received
      The time that the reply was sent
      Requester time index
   Connection Request
      The connections index (zero for a new connection)
      Requested receiving port
      An additional set of flags (which may be used or unused) for a variety of purposes
   Connection Reply
      The replier's base time
      A time offset from the point of receiving the request in milliseconds
      The connections index (zero for a new connection)
      An additional set of flags (which may be used or unused) for a variety of purposes
   Data
      Data sequence number
      Time that the message was sent The rest of the packet comprises the packet body or payload portion. Alert and Acknowledge packets do not have bodies. All other packets contain bodies that carry additional information appropriate to the message itself (for example, a data packet will send the data itself).

It is important to note that alerts and QoS information are built into the protocol and do not need to be passed as data packets. Since these types of information are not built into TCP they would need to be sent as data, which might affect the application using the protocol. This means that the receiving end needs to process the packet only once to draw out the information it requires. In contrast, when QoS information is sent as a data packet in TCP, the receiving end has to process the packet as a data packet simply to get to the information that allows the alert or QoS information to be processed, which means that TCP must double the amount of processing for alerts and QoS information.

Of particular interest in the present invention, the exchange of time synchronization information 707 enables front-end 201 and back-end 203 to have a common time base and ascertain the time of issue of any received packet. While the current implementation does not include base time or time index data in the header of data packets, this information can readily be included in all message types, a subset of message types, and/or in a special message type defined for real-time data transport. In this manner, the recipient of a TMP packet knows with a high level of certainty when a received packet was transmitted, something that existing Internet protocols do not provide. In the case of TMP packets from a back-end 203 to a front-end 201, the information can be used by the front-end 201 as a factor in ordering responses to clients 205. In the case of TMP packets from a back-end 203 to a front-end 201, the information can be used by the front-end 203 as a factor in ordering responses to clients 205.

Rather than synchronizing clocks the front-end 201 and back-end 203 (i.e., absolute time synchronization), the time synchronization information 707 may indicate a differential between the clocks of the two machines (i.e., relative time synchronization). Relative time synchronization can be used substantially equivalently to information that would allow actual synchronization of the clocks. Accordingly, "time synchronization" and "time synchronized" refer inclusively to both absolute and relative time synchronization methods.

The time synchronization information 707 augments or replaces the "time to live" feature of conventional IP packets. Each IP packet specifies a time to live value that must be decremented by each router or device that handles the packet. As the time value can only be incremented in one-second units, the value becomes a hop count rather than an actual timing function. When a packet's time to live value is decremented to zero, it is discarded and must be retransmitted. In accordance with the present invention, the time to live value for TMP packets can be used more meaningfully as the recipient knows when the packet was actually sent and can set or reset the time to live value to a meaningful value when the packet leaves a front-end 201 or back-end 203.

As in all protocols, the messages in TMP have an order in which they are sent as well as particular defined situations in which they are sent. A typical TMP session might begin with a connection request. For reference, the end point that sends the connection request will be referred to as the front-end, and the receiver of the request will be referred to as the back-end, although the TMP protocol operates bi-directionally between front-ends and back-ends. The front-end 201 sends a connection request to the back-end 203, and the back-end 203 sends a connection reply back to the front-end 201. This reply will be either positive (connection accepted), or negative (connection refused). If the reply is positive, then the connection is established and the front-end and back-end can begin to exchange data.

TMP is a TCP-like protocol adapted to improve performance for multiple connections operating over a single pipe. The TMP mechanism in accordance with the present invention creates and maintains a stable connection between two processes for high-speed, reliable, adaptable communication. TMP is not merely a substitute for the standard TCP environment. TMP is designed to perform particularly well in heterogeneous network environments such as the Internet. TMP connections are made less often than TCP connections. Once a TMP connection is made, it remains up unless there is some kind of direct intervention by an administrator or there is some form of connection-breaking network error. This reduces overhead associated with setting up, maintaining and tearing down connections normally associated with TCP.

Another feature of TMP is its ability to channel numerous TCP connections through a single TMP pipe 202. The environment in which TMP resides allows multiple TCP connections to occur at one end of the system. These TCP connections are then mapped to a single TMP connection. The TMP connection is then broken down at the other end of the TMP pipe 202 in order to traffic the TCP connections to their appropriate destinations. TMP includes mechanisms to ensure that each TMP connection gets enough of the available bandwidth to accommodate the multiple TCP connections that it is carrying.

Another advantage of TMP as compared to traditional protocols is the amount of information about the quality of the connection that a TMP connection conveys from one end to the other of a TMP pipe 202. As often happens in a network environment, each end has a great deal of information about the characteristics of the connection in one direction, but not the other. QoS information 708 is exchanged between front-end 201 and back-end 203 in accordance with the present invention. By knowing about the connection as a whole, TMP can better take advantage of the available bandwidth.

A QoS message is sent alone or may be piggybacked on a data packet. It sends information regarding the connection from one end of the connection to the other. Both front-end 201 and back-end 203 send QoS messages. The information in a QoS message is the most up to date that the sending end has. That means that if a QoS message is to be resent, the QoS information is updated before it is resent. A QoS message is identified by the message type flag QoS. In a particular implementation, a QoS message contains:

16 Bits—Average round trip time (RTT). This indicates the average round trip time as calculated by this end of the system over the last time interval, measured in milliseconds.

32 Bits—Packets Sent. This indicates the number of packets that were sent in the last time interval.

32 Bits—Packets Received. This indicates the number of packets that were received in the last time interval.

32 Bits—Packets Resent. This indicates the number of packets that needed to be resent in the last time interval.

16 Bits—Window Size. This value indicates the current window size that one end is operating under. This will allow for a random sampling of window sizes to be gathered at the other end.

16 Bits—Packets in Flight. This value indicates the current number of packets that one end has sent to the other end without receiving an acknowledgement. This will allow for a random sampling of packets in flight to be gathered by the other end.

32 Bits—Time Interval. The span of time that the information in the QOS packet is dealing with. This parameter is measured in seconds.

In this manner, both front-end 201 and back-end 203 are aware of not only their own QoS metrics, but also those of the machine with which they are communicating and their shared communication link.

As suggested in FIG. 7, QoS information 708 and time synchronization information 707 can be used by blender 404 to select the order in which data is placed into TMP units 705. Also, QoS information 708 can be used by TMP mechanisms 405 and 505 to alter the TMP behavior.

In contrast with conventional TCP mechanisms, the behavior implemented by TMP mechanism 405 is constantly changing. Because TMP obtains bandwidth to host a variable number of TCP connections and because TMP is responsive to information about the variable status of the network, the behavior of TMP is preferably continuously variable. One of the primary functions of TMP is being able to act as a conduit for multiple TCP connections. As such, a single TMP connection cannot behave in the same manner as a single TCP connection. For example, imagine that a TMP connection is carrying 100 TCP connections. At this time, it loses one packet. TCP would require that the connection bandwidth be cut in half. This is a performance reduction on 100 connections instead of just on the one that lost the packet.

Each TCP connection that is passed through the TMP connection must get a fair share of the bandwidth, and should not be easily squeezed out by competing users of the available bandwidth. To allow this to happen, every TMP connection becomes more aggressive in claiming bandwidth as it accelerates. Like TCP, the bandwidth available to a particular TMP connection is measured by its window size (i.e., the number of outstanding TCP packets that have not yet been acknowledged). Bandwidth is increased by increasing the window size, and relinquished by reducing the window size. Up to protocol specified limits, each time a packet is successfully delivered and acknowledged, the window size is increased until the window size reaches a protocol specified maximum. When a packet is dropped (e.g., no acknowledge received or a resend packet response is received), the bandwidth is decreased by backing off the window size. TMP also ensures that it becomes more and more resistant to backing off (as compared to TCP) with each new TCP connection that it hosts. Further, a TMP should not go down to a window size of less than the number of TCP connections that it is hosting.

In a particular implementation, every time a TCP connection is added to (or removed from) what is being passed through the TMP connection, the TMP connection behavior is altered. It is this adaptation that ensures successful connections using TMP. Through the use of the adaptive algorithms discussed above, TMP is able to adapt the amount of bandwidth that it uses. When a new TCP connection is added to the TMP connection, the TMP connection becomes more aggressive to accommodate it. When a TCP connection is removed from the TMP connection, the TMP connection becomes less aggressive.

TMP connection 202 provides improved performance in its environment as compared to conventional TCP channels, but it is recognized that TMP 202 resides on the Internet in the preferred implementations. Hence, TMP must live together with many protocols and share the pipe efficiently in order to allow the other transport mechanisms fair access to the shared communication bandwidth. Since TMP takes only the amount of bandwidth that is appropriate for the number of TCP connections that it is hosting (and since it monitors the connection and controls the number of packets that it puts on the line), TMP will exist cooperatively with TCP traffic. Furthermore, since TMP does a better job at connection monitoring than TCP, TMP is better suited to throughput and bandwidth management than TCP.

Figure 8:
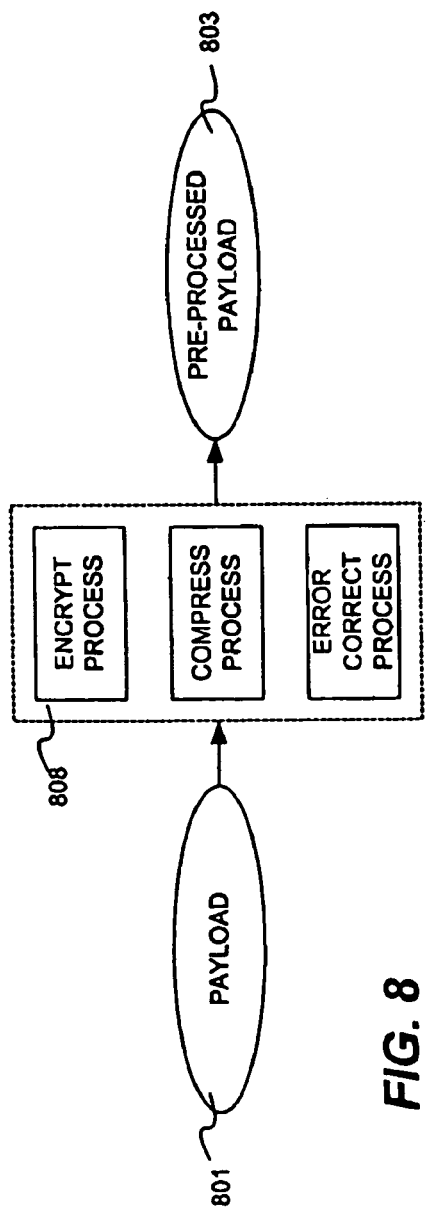
FIG. 8 illustrates exemplary pre-processing processes.

FIG. 8 illustrates an exemplary set of processes 808 implemented by pre-processing units 408 and 508. Some, none, or all processes illustrated in FIG. 8 may be implemented on particular packets as described hereinbefore. Unprocessed payload 801 from a payload portion of a packet are passed to processes 808 that perform encryption, compression, and/or error correction. The actual algorithms used to implement encryption, compression and/or error correction in any specific implementation are a design choice made be to meet the needs of a particular application. Error correction is preferably forward error correction that adds redundant data to the pre-processed payload so that a recipient can reconstruct the payload portion in the presence of one or more transmission errors. The amount and format of redundant information can be varied dynamically to account for current QoS conditions as reported by, for example, QoS information 708.

Figure 9:
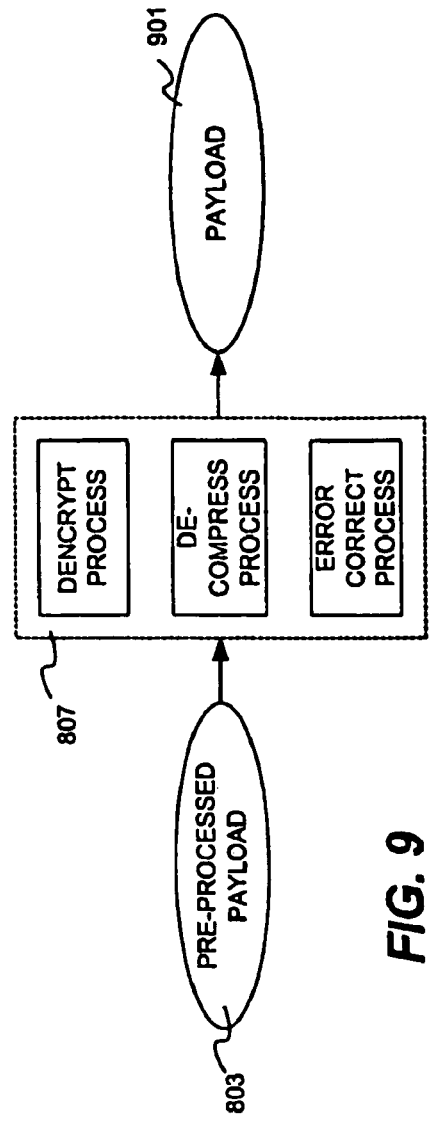
FIG. 9 illustrates exemplary post-processing processes.

FIG. 9 illustrates an exemplary set of processes implemented by post-processing units 407 and 507. Some, none, or all processes illustrated in FIG. 9 may be implemented on particular packets depending on the corresponding pre-processing performed on the packets. Pre-processed packets are passed to processes that perform decyrption, decompression, and/or error correction decoding. The actual algorithms used in any specific implementation are determined to complement the pre-processing processes. Error correction operates to detect one or more transmission errors, determine if the detected errors are correctable, and when correctable, reforming the corrected payload. Payload portion 903 is essentially a fully-formed payload portion of, for example, an HTTP packet.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, while devices supporting HTTP data traffic are used in the examples, the HTTP devices may be replaced or augmented to support other public and proprietary protocols and languages including FTP, NNTP, SMTP, SQL and the like. In such implementations the front-end 201 and/or back-end 203 are modified to implement the desired protocol. Moreover, front-end 201 and back-end 203 may support different protocols and languages such that the front-end 201 supports, for example, HTTP traffic with a client and the back-end supports a DBMS protocol such as SQL. Such implementations not only provide the advantages of the present invention, but also enable a client to access a rich set of network resources with minimal client software.

An additional aspect of the invention is a testing system and a method of testing a network infrastructure to identify or diagnose anomalies in a variety of networks and/or the links therein. It is contemplated that public and private links, such as the communications links described above may be tested. The system and method have particular application to the testing of one or more TMP networks or links. Preferably, the testing is automatic or automated such as to require little or no manual intervention. This allows tests to be performed quickly, repeatedly, and consistently. It is contemplated that the testing system may increase the speed of overall testing by at least four times in one or more embodiments. As will be described further below, results from testing may be recorded for review or reporting. In one or more embodiments, the testing system provides the benefit of easy to read charts allowing users to quickly analyze test results and identify anomalies.

Figure 10:
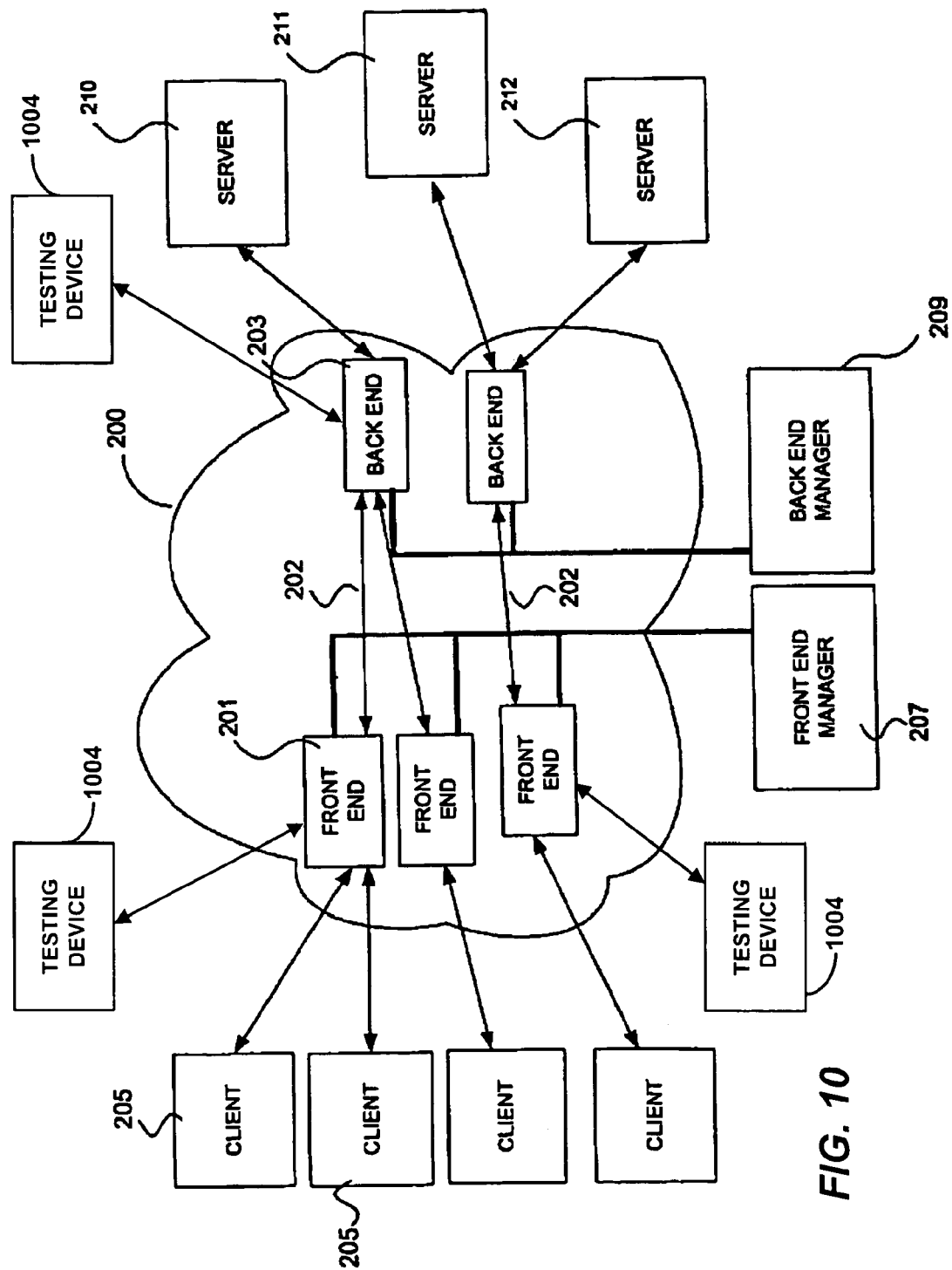
FIG. 10 illustrates in block-diagram form entity relationships in a system in accordance with the present invention.

FIG. 10 illustrates a block diagram of an exemplary network infrastructure having one or more testing systems 1004 connected thereto. As can be seen testing systems 1004 may be connected at various locations of a network infrastructure. In the embodiment of FIG. 10, testing systems are connected to various front-ends 201 and back-ends 203 to allow testing of one or more TMP links 202 and other links between the front-ends and the back-ends. Of course, testing systems may be connected to various other devices within a network infrastructure.

In one embodiment a testing system 1004 may comprise testing system hardware and/or software used to conduct one or more network tests. For example, testing system hardware may be a computer, network appliance, or the like capable of performing the testing functions described herein. In one embodiment, the testing system hardware may comprise a processor, a memory device, and at least one network interface. The processor may be used to execute instructions to perform testing, record test results, display test results, or a combination thereof. It is noted that the processor may read machine readable code or be hardwired to execute one or more portions of the testing functions described herein in some embodiments. The network interface may be used to generate network traffic for testing purposes as well as to communicate with other network devices. It is contemplated that a testing system 1004 may be controlled remotely through a network interface in some embodiments. The memory device may be used to store data in a tangible medium, such as executable data (i.e. machine readable executable code), non-executable data, or both used for testing as described below. For example, in one embodiment, the memory device may store one or more scripts, network infrastructure configurations, test configurations, test results, or a combination thereof.

It is contemplated that the testing system 1004 may be implemented on various network hardware as well. For example, rather than a dedicated testing system 1004, it is contemplated that the testing system may be implemented in a front-end mechanism 201, back-end mechanism 203, server 210, a client 205 or other device. In one embodiment, the testing system 1004 may comprise software executable on a computer or other network device other than a dedicated testing system.

In one or more embodiments, a network infrastructure configuration may be provided as part of a testing system 1004. A network infrastructure configuration as used herein will generally refer to settings, configurations, and other information used to configure the operation of the network infrastructure or components thereof. For example, a network infrastructure configuration may be a file or other data used to store settings or configurations for a network device or devices, such as but not limited to a front-end 201 and a back-end 203.

A network infrastructure configuration may be modified in real-time by a testing system to test any network configuration of a targeted network infrastructure that may be desired. In this manner, different configurations of a network infrastructure or the devices therein may be tested. In addition, a network infrastructure configuration may include setting, configurations, or the like for other network devices such as but not limited to routers, switches, access points, firewalls, various network applications, and VPN clients/servers. A network infrastructure configuration may be stored in one or more data files on a storage medium and may comprise settings, configurations, or the like for one or more network devices.

In one embodiment, a testing system may push or upload a network infrastructure configuration to a network device thereby configuring the device according to the network infrastructure configuration. This is beneficial because the testing system may utilize different configurations of various network devices prior to or during one or more tests, or at other times. Anomalies may be diagnosed as well by testing various network infrastructure configurations. In one embodiment, the testing system may automatically use one or more different network infrastructure configurations from test to test depending on conditions experienced within the network or anomalies occurring within the network. In this manner, the most desirable configuration for a network infrastructure may be identified.

The testing system may conduct tests according to a script in one or more embodiments. Of course, testing may also be manually initiated and controlled as well. In addition, one or more functions of a script may be manually executed to manually conduct testing. The script may comprise instructions or commands which are executable by the testing system. The script may also comprise one or more functions having one or more instructions. It is contemplated that each function may be configured to perform a particular task or tasks.

For example, the following exemplary functions, or various subsets thereof, may be provided in one or more embodiments.

Stop Test
    This function allows the user to pause the test. With many tests taking up to 72 hours, it is essential that the system be able to pause the test without requiring a restart.

Stop Front-End
    The testing system may include or be used with a front-end and back-end mechanism at both ends of a network. The "Stop Front-End" function may verify that the front-end mechanism is running. Upon confirmation that the front-end is running, the testing system may then stop the front-end and confirm the same. If the front-end does not stop properly, the testing system may retry stopping the front-end again.

Stop Back-End
    The testing system may include or be used with a front-end and back-end mechanism at both ends of a network. The "Stop Back-End" function may verify that the back-end mechanism is running. Upon confirmation that the back-end is running, the testing system may then stop the back-end and confirm the same. If the back-end does not stop properly, the testing system may retry stopping the back-end again.

Create Front-End Configuration
    Once a test configuration file has been parsed this function takes the data parsed from the test configuration file and replaces lines in the network infrastructure configuration for a front-end mechanism to alter the network infrastructure for a test.

Create Back-End Configuration
    Once a test configuration file has been parsed this function takes the data parsed from the test configuration file and replaces lines in the network infrastructure configuration for a back-end mechanism and a web server to alter the network configuration for a test.

Start Front-End
    The testing system may include or be used with a front-end and back-end mechanism at both ends of a network. The "Start Front-End" function verifies that the front-end mechanism is running. If the front-end is not running, the testing system may then start the front-end and confirm that it is running. If the front-end does not start properly, the testing system may retry starting the front-end.

Start Back-End
    The testing system may include or be used with a front-end and back-end mechanism at both ends of a network. The "Start Back-End" function verifies that the back-end mechanism is running. If the back-end is not running, the testing system may then start the back-end and confirm that it is running. If the back-end does not start properly, the testing system may retry starting the back-end.

Configure WANem
    The testing system may parse a configuration test file to determine the WAN configuration such as how much bandwidth is desired for a network simulation or how much latency or loss is desired as part of the simulation. Once this configuration data is parsed from the configuration test file, the data is used to configure a 3rd party product for WAN testing such as the wan emulator product named WANem.

Run
    The Run function uses the individual functions defined within a testing system, such as within a script, to execute a test configured by a user or test operator. The Run function may parse and interpret a configuration test file to execute an individual test. The Run function may also execute the functions to stop, configure, and start elements of the test environment, such as described above. The Run function may also utilize the data parsed from the configuration test file to execute a 3rd party product such as AB, a benchmarking tool from the Apache Software Foundation (Apache is a trademark of the Apache Software Foundation). Additional data within the configuration test file may be used to setup additional simulation parameters such as the number of users and the length of the test. An exemplary Run function (Run test( ) is provided below for purposes of illustration.

Main
    This function may provide an initial function to setup the test framework and conduct one or more tests or execute a testing loop until all desired tests have been performed. An exemplary Main function (Main( )) is provided below for purposes of illustration.

In one or more embodiments, testing is initiated by running the script. The script may be stored on a storage medium that is connected to or part of the testing system such as in a file or the like. For example, a script may be a script file written in a scripting language such as the C-Shell scripting language found on UNIX or other operating systems. Of course, the script may also be other types of files including but not limited to other types of script files and executable files.

Within a script, commands may be incorporated to configure and execute one or more tests. For example, commands may also be included to push or upload network infrastructure configurations to various network devices to configure the network devices prior to or during a test, or at other times. A script may also include commands to retrieve test results from various network devices. It is contemplated that test results may be retrieved during testing if desired. A script may also include instructions to parse and/or display test results to one or more users.

A script may utilize other information or files to perform its tasks. For example, a script may read from and write to one or more data files to configure or execute one or more tests. In one embodiment, a configuration test file may be utilized by the script. A configuration test file may comprise a variety of data related to testing. For example, a configuration test file may comprise settings or configurations for various network devices (e.g. front-end and back-end mechanisms) to be used for one or more tests. The configuration test file may use one of a plurality of various formats such as a CSV formatted file where each line has values or fields that are separated by a comma.

In one embodiment, the configuration test file may include one or more functions. The functions in the configuration test file may be called or executed to perform various tasks. For example, a function that parses and separates the information from test configuration files, network infrastructure configurations, or both in CSV or other formats may be included. It is noted that a script may call or execute other functions or programs provided by the testing system such as by those in testing system's operating system, libraries, or other software.

The script may be configured to read from or write to a network infrastructure configuration in one or more embodiments. A script may execute or call its own or other functions to accomplish this. In one embodiment, a script may replace values, such as configuration parameters or settings, within a network infrastructure configuration of a network device to configure the operation of the network device. This may occur in various ways. In one embodiment, the script parses a network infrastructure configuration and replaces one or more values to make the desired changes. The network infrastructure configuration may then be pushed or uploaded to a network device. In another embodiment, the script may change one or more values of a network infrastructure configuration by sending the desired values to a network device. The network device may then update its network infrastructure configuration accordingly. It is contemplated that communication of network infrastructure configuration data may be secured such as by private networks, encryption, passwords, or other security mechanisms.

Figure 11:
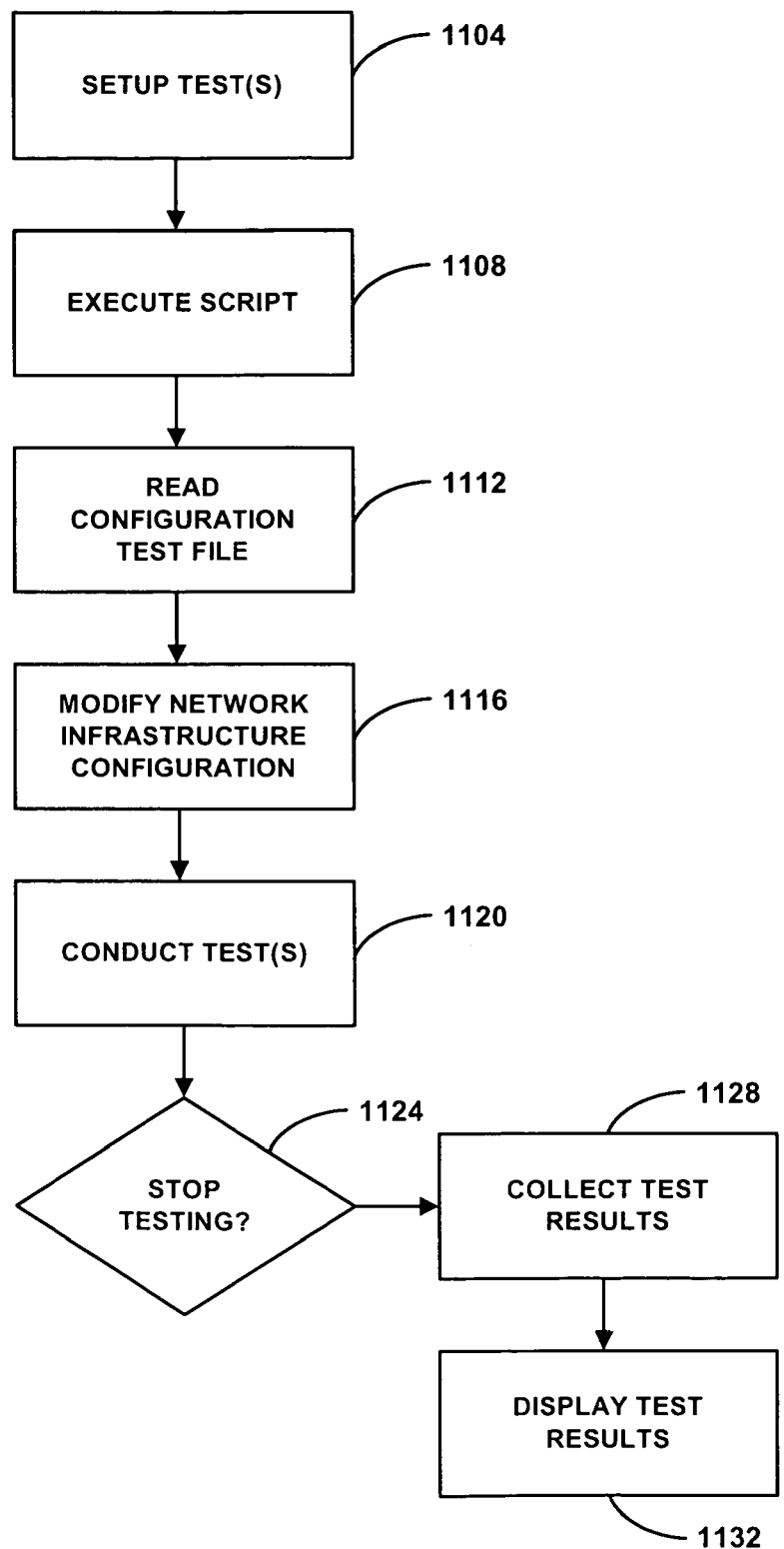
FIG. 11 illustrates exemplary testing processes.

Operation of an exemplary testing system will now be described. FIG. 11 is a flow diagram illustrating operation of the testing system according to one embodiment. Though presented in a particular order, it will be understood that one or more of the steps described herein may occur in various orders.

At a step 1104 a user may setup one or more tests to be performed on a network infrastructure. In one or more embodiments, this may comprise creating or modifying a configuration test file as desired. As stated, the configuration test file may comprise functions and network infrastructure configuration settings for one or more tests. These functions and settings may be configured or set as desired for the one or more tests.

At a step 1108, a script may be executed to initialize and conduct testing of a network infrastructure. Generally, this comprises running or executing the script on the testing system. For example, where the script is a shell script named run.sh, the script may be executed by typing run.sh into a command line of the testing system and hitting return or enter. It will be understood that a script may be executed in various other ways. The testing system then continues to execute the instructions or commands in the script or functions used by the script to conduct one or more tests.

At a step 1112 the testing system may parse one or more configuration test files to obtain the values, such as configuration settings, therein. In one or more embodiments, the testing system parses the configuration test file in a very linear fashion. It is noted that the testing system may execute one or more functions to parse a configuration test file. As noted above, the functions may be provided by the testing system, in the script, in a configuration test file, or a combination thereof.

Once the values are obtained, at a step 1116, the testing system may incorporate the desired values into one or more network infrastructure configurations. The testing system may use one or more functions to interpret a network infrastructure configuration file and push in the desired values from a configuration test file into the network infrastructure configuration. In one embodiment, the testing system only pushes in values which are different in the configuration test file. In another embodiment, the testing system pushes in all values of a configuration test file regardless of whether or not they are different.

The pushing of values to a network infrastructure configuration may occur in various ways. In some embodiments, the push of values may occur by the testing system overwriting values in a current network infrastructure configuration with those from the configuration test file. Alternatively, a new network infrastructure configuration may be created which incorporates values from the configuration test file. The old network infrastructure configuration may then be deleted or overwritten. The network infrastructure configuration may then be sent, copied, or otherwise communicated to one or more network devices to update or change their current configuration or operation.

It is contemplated that the testing system may be utilized with a front-end and back-end mechanism such as those described above. In these embodiments, once the appropriate values from a configuration test file have been incorporated, a network infrastructure configuration may be pushed to a front-end mechanism, a back-end mechanism, or both. This communication may be secured in one or more embodiments. For example, a network infrastructure configuration may be encrypted and sent to the front or back-end mechanism for decryption before use. Alternatively, or in addition, a network infrastructure configuration may be sent over an encrypted connection to a front or back-end mechanism. It is contemplated that the front-end and back-end mechanism may be configured with a particular IP address to receive network infrastructure configurations as well as other communications for administration or configuration. One or more other IP addresses may be used for regular or other network communication. For example, a TMP link or other link may be established using the one or more other IP addresses. Of course the testing system herein may also work with front-end or back-end mechanisms having a single IP address as well.

After the desired values have been used to update one or more network infrastructure configurations of one or more network devices, such as the front-end and back-end mechanisms, the network devices may operate according to the new configurations and settings in the updated network infrastructure configurations. If necessary, the network devices may be reset or rebooted to ensure that the devices use the new network infrastructure configurations. In one or more embodiments, the testing system may send a reboot, reset, reinitialize, or similar command or commands to the network devices. This communication may be secured, such as described above, if desired.

At a step 1120, the testing system may execute a test of the network infrastructure. Generally, such testing involves sending and receiving one or more types of data of various sizes utilizing various network protocols and measuring the latency, bandwidth, network utilization, error rate, and other metrics as the data is sent. For example, the data types and protocols as described above may be used to send/receive data for testing purposes. The metrics recorded or measured during a test may be saved for later analysis on the network devices themselves or on the testing system.

A test may include running one or more benchmarking programs, such as AB, mentioned above. It is contemplated that various data transfer methods may be tested. For example, various tests may be run to test or benchmark data transfer methods such as but not limited to, HTTP, FTP, and CIFS.

It is contemplated that a test may be repeated multiple times at step 1120 using the same network infrastructure configurations. A single test may generate results which do not represent the performance or other characteristic of a network infrastructure that would be commonly encountered. Thus, conducting a test multiple times may be beneficial in that the results from multiple tests may provide more representative test results. It is contemplated that the script, a configuration test file, or other data readable by the script may indicate the number of times a test is to be performed in one or more embodiments. For example, a script may include one or more loops to conduct a test multiple times. Also, in some embodiments, a test may be repeated indefinitely until it is stopped by a user. The testing system provides the benefit of allowing repeated testing automatically in succession or at various time intervals as desired.

At a decision step 1124, if there are further instructions or commands in the script, the testing system may continue testing such as by returning to step 1112 to read additional values from a configuration test file. Typically, these values will be different from previous values to test a different configuration of the network infrastructure. As described above, the values may thus turn on, turn off, reconfigure, or otherwise change the operation of one or more network devices. In this manner, the performance or other characteristics of a network infrastructure for various network infrastructure configurations may be compared. For example, a first test or tests may test a network infrastructure or network devices having the TMP protocol turned on while a second test or tests may test the network infrastructure or network devices having the TMP protocol turned off. Other protocols, such as TCP, may be turned on or used instead. In one embodiment, an AB test is conducted with the TMP protocol on, and then the exact same AB test is conducted with the TMP protocol off, to determine the performance increase obtained through the TMP protocol.

As described above, the values from the configuration test file may then be incorporated (e.g. pushed) into one or more network infrastructure configurations at step 1116 to alter the operation of one or more network devices, and one or more tests of the network infrastructure may then occur at step 1120. This process may be repeated until the script ends such as where there are no further instructions or commands to be executed in the script. It is noted that testing may also end when all data has been read from a configuration test file in some embodiments.

At decision step 1124, if there are no further instructions or commands, the testing system may continue to a step 1128 where test results may be gathered or collected by the testing system. In one embodiment, the testing system may collect the test results by downloading or otherwise retrieving test results stored on one or more network devices. During testing, test results may be stored on one or more network devices, such as the devices being tested. For example, a front-end or back-end mechanism may store test results for one or more tests of a TMP link or other link between the front and back-end mechanism. The testing system may also store test result during a test in one or more embodiments. It is noted that if the testing system is storing test results during a test, the step of collecting test results from one or more network devices may not be required. It is contemplated that, in some embodiments, test results may be collected after each individual test rather than after all tests have completed.

In embodiments where a front-end or back-end mechanism are part of the testing or being tested, it is contemplated that the test results may be collected by copying the test results from these mechanisms. In one embodiment, secure copying software such as SCP may be used to copy or retrieve the test results. The test results may be encrypted, may be communicated over an encrypted connection, communicated over a private network, or a combination thereof if desired. For example, the administration or configuration IP address of a front or back-end mechanism, as described above, may be used to collect test results. Of course other IP addresses may be used to collect test results as well.

At a step 1132 the test results may be displayed to one or more users. In one or more embodiments, the test results may be formatted for display. For example, the test results may be parsed and/or converted into various number formats, figures, graphs, charts, and the like and then displayed. The test results may also be formatted into a data format which may be read to display the test results. For example, the test results may be stored in an XML, CSV, spreadsheet, or other data file which may be read to provide a display of the test results. In one embodiment, a Python script may be used to parse out test results in one format and write the parsed data in XML format. It is contemplated that test results may also be stored in a database in some embodiments. The test results may be displayed on a screen, printout, or in other ways now known or later developed. In one embodiment, the test results may be communicated to a web server where the test data can then be viewed as a chart or in other forms as a web page. The test results may be interpreted to determine bandwidth consumption and to identify network latencies. In one or more embodiments, the interpretation may be performed manually by a human operator or may be displayed as a pass or fail parameter and stored and displayed as a test result summary.

In one embodiment, the testing system, such as through a script, may collect the relevant test result information and convert it into an XML format that a reporting webpage can interpret to display the results. It is contemplated that the reporting webpage may display the results as charts, graphs, figures, and in other ways. For example, where TMP is being tested, three sets of information may be displayed by a reporting webpage: TCP's throughput, TMP's throughput, and a baseline throughput. Where applicable, this may provide confirmation that TMP is performing better than TCP performance, and additionally is on par or better than other data communication protocols or methods.

It is contemplated that one or more test results from one or more tests may be combined into a single display. For example, test results from a first test or first group of tests may be combined with test results from one or more other tests or groups of tests. In this manner, the results of multiple tests may be combined in a single display. This allows comparisons of various network infrastructure configurations to be more easily made.

The script executed to conduct testing may include one or more functions or instructions used to parse and/or display test results. In this manner, test results may automatically be available to one or more users when a test or tests are complete. For example, a script may be configured to parse test results and convert the results into a CSV, HTML, XML, or other format.

The following is a code listing of exemplary functions, such as those in or used by a script, which have been referred to above.

```
function Main( ) {
    while [ $? != 255 ]; do
      sleep 5
    Run_test
    done
    return 1
}
function Run_test( ) {
    Stop_Test
    number_of_lines=`wc -l config.csv | awk '{ print $1 }'`
    exec < config.csv
    while read line;
    do
        if [ ${number_of_lines} = 1 ]; then
            echo "Testing has been completed"
            return -1
            exit
        else
            cp ${base_dir}/fe_backup/*cfg ${base_dir}/fe_use_configs/
            cp ${base_dir}/be_backup/*cfg ${base_dir}/be_use_configs/
            test_sequence_number=`echo ${line} | sed 's/,/ /g' | awk '{ print $1 }'`
            echo ${test_sequence_number}
            cfg_bemax_que_size=`echo ${line} | sed 's/,/ /g' | awk '{ print $2 }'`
            echo ${ cfg_bemax_que_size}
            cfg_beHWMark=`echo ${line} | sed 's/,/ /g' | awk '{ print $3 }'`
            echo ${cfg_beHWMark}
            cfg_beLWMark=`echo ${line} | sed 's/,/ /g' | awk '{ print $4 }'`
            echo ${cfg_beLWMark}
            cfg_Wanem_Bw=`echo ${line} | sed 's/,/ /g' | awk '{ print $8 }'`
            echo ${cfg_Wanem_Bw}
            cfg_Wanem_Delay=`echo ${line} | sed 's/,/ /g' | awk '{ print $9 }'`
            echo ${cfg_Wanem_Delay}
            cfg_Wanem_Jitter=`echo ${line} | sed 's/,/ /g' | awk '{ print $10 }'`
            echo ${cfg_Wanem_Jitter}
            cfg_Wanem_Loss=`echo ${line} | sed 's/,/ /g' | awk '{ print $11 }'`
            echo ${cfg_Wanem_Loss}
            cfg_femax_que_size=`echo ${line} | sed 's/,/ /g' | awk '{ print $5 }'`
            echo ${ cfg_femax_que_size}
            cfg_feHWMark=`echo ${line} | sed 's/,/ /g' | awk '{ print $6 }'`
            echo ${cfg_feHWMark}
            cfg_feLWMark=`echo ${line} | sed 's/,/ /g' | awk '{ print $7 }'`
            echo ${cfg_feLWMark}
            cfg_ab_n=`echo ${line} | sed 's/,/ /g' | awk '{ print $12 }'`
            echo ${cfg_ab_n}
            cfg_ab_c=`echo ${line} | sed 's/,/ /g' | awk '{ print $13 }'`
            echo ${cfg_ab_c}
            cfg_ab_file_size=`echo ${line} | sed 's/,/ /g' | awk '{ print $14 }'`
            echo ${cfg_ab_file_size}
            sed '1d' config.csv > config2.csv
            mv config2.csv config.csv
            Stop_FE
            Stop_BE
            Create_fecfg
            Create_becfg
            cfg_WANem
            StartFE
            StartBE
            Date=`date "+TR_DATE:%m\%d\%y_%H:%M:%S"`
            echo
            "*******************************************************
            *" >testresults.txt
            echo "---------- THIS TEST WAS TAKEN ON ${Date}-----------------------"
            >>testresults.txt
            echo
            "*******************************************************
            *" >>testresults.txt
            echo "" >>testresults.txt
            echo
            "*******************************************************
            *" >>testresults.txt
            echo "---------- BEGINNING OF THE WARP TEST RUN ----------------------"
            >>testresults.txt
            echo
            "*******************************************************
```

```
            *" >>testresults.txt
            echo "" >>testresults.txt
            set -x
            ab -t ${runtime} -c ${cfg_ab_c} http://${behost}/testfiles/${cfg_ab_file_size} >>
            testresults.txt 2>>error.log
            set +x
            sleep 2
            Stop_FE
            ab -t ${runtime} -c ${cfg_ab_c} http://${behost}/testfiles/${cfg_ab_file_size} >>
            testresults.txt 2>>error.log
            mv testresults.txt testresults/test_number${test_sequence_number}.txt
            mv testresults/test_number*
            testresults/testresults_${build_date}./create_chart3.py -d
            testresults_${build_date}
        fi
    done < config.csv
    return 3
}
```

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A testing system for a network comprising:
a first network infrastructure configuration and a second network infrastructure configuration, both defining operational settings for one or more testing devices;
a configuration test file comprising changes to said first network infrastructure configuration and said second network infrastructure configuration;
a first testing device configured to send request/response traffic and to modify the first network infrastructure configuration and said second network infrastructure configuration according to said configuration test file at a time when said request/response traffic is being sent, said first testing device operating according to the first network infrastructure configuration;
a second testing device configured to receive said request/response traffic, said second testing device operating according to the second network infrastructure configuration;
at least one communication link between said first testing device and said second testing device;
wherein said first testing device and said second testing device are further configured to conduct one or more performance tests by transferring said request/response traffic between said first testing device and said second testing device through said at least one communication link, whereby one or more test results are generated by said one or more performance tests.

2. The testing system of claim 1 further comprising one or more network devices that establish said at least one communication link between said first testing device and said second testing device, said one or more network devices operating according to a network infrastructure configuration, wherein said first testing device or said second testing device is configured to modify said network infrastructure configuration.

3. The testing system of claim 2, wherein said first testing device and said second testing device are configured to encode said request/response traffic according to preselected compatible semantics, and wherein said act of encoding comprises communicating quality of service information about said at least one communication link between said first testing device and said second testing device.

4. The testing system of claim 1, wherein said first testing device and said second testing device selectively activate and deactivate encoding of said request/response traffic from a first protocol to a second protocol when said first network infrastructure configuration and said second network infrastructure configuration are modified.

5. The testing system of claim 1, wherein said first testing device comprises a processor configured to interpret said configuration test file, a network interface configured to send said request/response traffic, and a memory device configured to store said configuration test file.

6. The testing system of claim 1 further comprising a web server configured to receive said one or more test results and to generate one or more web pages displaying said one or more test results.

7. A testing system comprising:
one or more network interfaces for communication with a plurality of network devices, the plurality of network devices establishing a communication link having a first end and a second end;
a configuration test file stored on a memory device, said configuration test file comprising settings for controlling operation of each of said plurality of network devices;
a processor configured to generate test results by conducting a plurality of data transfers between at least two of said plurality of network devices at said first and second end of said communication link to performance test said communication link;
wherein said one or more network interfaces send at least some of said settings to said plurality of network devices between at least two of said plurality of data transfers, said at least some settings changing operation of said plurality of network devices between said at least two of said plurality of data transfers.

8. The testing system of claim 7, wherein said at least some of said settings are configured to activate and deactivate a data transport mechanism between said plurality of network devices.

9. The testing system of claim 8, wherein said data transport mechanism utilizes a communication protocol other than TCP/IP when activated.

10. The testing system of claim 7 wherein said one or more network interfaces are configured to provide a secure communication link for sending said at least some of said settings to said plurality of network devices.

11. The testing system of claim 7 further comprising a display, wherein said test results are formatted and displayed on said display.

12. The testing system of claim 7, wherein said configuration test file comprises one or more functions executable by said processor during said one or more performance tests.

13. The testing system of claim 7, wherein said test results comprise network characteristics selected from the group consisting of throughput, bandwidth, latency, quality of service, error rate, and utilization.

14. A method for testing a network infrastructure comprising:
  reading one or more first and second device settings from a configuration test file;
  sending at least some of said one or more first device settings to a first network device to configure said first network device;
  sending at least some of said one or more first device settings to a second network device to configure said second network device;
  sending at least some of said one or more second device settings to a first network device to reconfigure said first network device;
  sending at least some of said one or more second device settings to a second network device to reconfigure said second network device;
  conducting one or more tests by executing a plurality of data transfers between said first network device and said second network device while said first network device and said second network device are configured with said at least some of said first device settings, and while said first network device and said second network device are configured with said at least some of said second device settings; and
  repeating the above steps one or more times.

15. The method of claim 14, wherein the first testing device comprises a front-end mechanism, and the second testing device comprises a back-end mechanism.

16. The method of claim 14 further comprising sending at least some of said first or second device settings to one or more third network devices located between the first and second network device in the network infrastructure, wherein said plurality of data transfers occurs through said one or more third network devices.

17. The method of claim 14, wherein said configuration test file comprises one or more portions defining at least one test where said first network device and said second network device are configured to encode data according to a first protocol and at least another test where said first network device and said second network device are configured to encode data according to a second protocol, the second protocol distinct from the first.

18. The method of claim 14, wherein the plurality of data transfers comprise transferring HTTP traffic generated by the first network device and the second network device between the first network device and the second network device.

19. The method of claim 14 further comprising storing test results from said plurality of data transfers that occurred during said one or more tests.

20. The method of claim 14 further comprising sending said test results to a web server to allow said test results to be viewed on one or more web pages.

* * * * *